(12) United States Patent
Howorth et al.

(10) Patent No.: US 8,002,252 B2
(45) Date of Patent: Aug. 23, 2011

(54) ENGINE MOUNT AND ELASTOMERIC ELEMENT THEREOF

(75) Inventors: Peter D. Howorth, Erie, PA (US); Guangze Li, Shanghai (CN); Mark Smialowski, Erie, PA (US)

(73) Assignee: Lord Corporation, Cary, NC (US)

( * ) Notice: Subject to any disclaimer, the term of this patent is extended or adjusted under 35 U.S.C. 154(b) by 930 days.

(21) Appl. No.: 11/333,007

(22) Filed: Jan. 17, 2006

(65) Prior Publication Data

US 2006/0180965 A1 Aug. 17, 2006

(30) Foreign Application Priority Data

Jan. 14, 2005 (CN) ............................ 2005 1 0002169
Jan. 14, 2005 (CN) ...................... 2005 2 0000871 U

(51) Int. Cl.
*F16M 13/00* (2006.01)
(52) U.S. Cl. .................. 267/140.4; 267/141.1; 248/632; 248/634
(58) Field of Classification Search .......... 248/632–638; 267/140.1–141.7, 152, 153; 105/218.1, 224.1
See application file for complete search history.

(56) References Cited

U.S. PATENT DOCUMENTS

| | | | | |
|---|---|---|---|---|
| 2,377,492 A | * | 6/1945 | Gorton | ............................ 248/556 |
| 2,891,744 A | | 6/1959 | Hirst et al. | |
| 3,242,877 A | | 3/1966 | Hirst et al. | |
| 3,815,284 A | * | 6/1974 | Schubach | ........................ 49/466 |
| 3,991,537 A | * | 11/1976 | Brown | ........................ 52/718.05 |
| 4,007,924 A | * | 2/1977 | Jorn et al. | ....................... 267/282 |
| 4,084,801 A | | 4/1978 | Landers et al. | |
| 4,183,496 A | | 1/1980 | Brock et al. | |
| 4,406,593 A | | 9/1983 | Kessler | |
| 4,570,911 A | | 2/1986 | Konishi | |
| 4,681,306 A | * | 7/1987 | Hofmann et al. | ......... 267/140.13 |
| 4,733,854 A | | 3/1988 | Miyamoto | |
| 4,903,951 A | | 2/1990 | Miyamoto et al. | |
| 4,915,031 A | * | 4/1990 | Wiebe | ......................... 105/198.2 |
| 5,031,873 A | | 7/1991 | Rau | |
| 5,074,535 A | | 12/1991 | Colford | |
| 5,116,030 A | | 5/1992 | Nowak et al. | |

(Continued)

FOREIGN PATENT DOCUMENTS

CS 210726 B 1/1982

(Continued)

OTHER PUBLICATIONS

Patent Abstracts of Japan, vol. 004, No. 105 (M-023), Jul. 26, 1980, JP55063026 A, Nippon Kentetsu Co. Ltd., May 12, 1980, abstract.

(Continued)

*Primary Examiner* — Christopher P Schwartz
(74) *Attorney, Agent, or Firm* — Edward F. Murphy, III

(57) ABSTRACT

An isolation mount for supporting and isolating one part from another includes an inner member formed to be connected to one of the parts and an outer member formed to be connected to one of the parts. The inner member has a first and a second inner plates being connected at one end and extending at a first angle with respect to each other; the outer member also has a first and a second outer plates being connected at one end and extending at a second angle with respect to each other. The isolation mount further includes a first and a second individual elastomeric element compressed between respective inner and outer plates.

32 Claims, 22 Drawing Sheets

U.S. PATENT DOCUMENTS

| | | |
|---|---|---|
| 5,121,905 A | 6/1992 | Mann et al. |
| 5,145,330 A | 9/1992 | Uchiyama |
| 5,228,663 A | 7/1993 | Adler et al. |
| 5,651,535 A | 7/1997 | David |
| 5,743,509 A | 4/1998 | Kanda et al. |
| 5,944,297 A | 8/1999 | Flower et al. |
| 6,019,342 A | 2/2000 | Pelle |
| 6,030,016 A | 2/2000 | Rice |
| 6,113,083 A | 9/2000 | Pizanti |
| 6,129,327 A * | 10/2000 | Dubois ................... 248/634 |
| 6,178,894 B1 * | 1/2001 | Leingang ................ 105/224.1 |
| 6,189,874 B1 | 2/2001 | Carlson |
| 6,349,918 B1 * | 2/2002 | Bunker .................... 248/635 |
| 6,427,814 B1 | 8/2002 | Miyamoto |
| 6,435,489 B1 | 8/2002 | Rice et al. |
| 6,450,474 B1 | 9/2002 | Bucksbee |
| 6,502,883 B2 | 1/2003 | Rice |
| 6,543,756 B2 | 4/2003 | Ihara et al. |
| 6,588,820 B2 | 7/2003 | Rice |
| 6,644,633 B2 | 11/2003 | Graeve |
| 6,705,600 B2 | 3/2004 | Yamaguchi et al. |
| 6,715,746 B2 | 4/2004 | Bachmeyer et al. |
| 6,752,389 B2 | 6/2004 | Halladay et al. |
| 2005/0098374 A1 | 5/2005 | Moon |

FOREIGN PATENT DOCUMENTS

| | | |
|---|---|---|
| CS | 210726 B1 | 8/1983 |
| DE | 1867701 U | 2/1963 |
| DE | 2360857 | 6/1975 |
| GB | 464621 A | 4/1937 |
| GB | 2010438 A | 6/1979 |
| IT | 1030870 B | 4/1979 |
| JP | 2001-132795 A | 5/2001 |

OTHER PUBLICATIONS

Patent Abstracts of Japan, vol. 2000, No. 22, Mar. 9, 2001, JP2001132795 A, Bridgestone Corp., May 18, 2001, abstract.
International Search Report and Written Opinion for corresponding International Application No. PCT/US2006/001612.

* cited by examiner

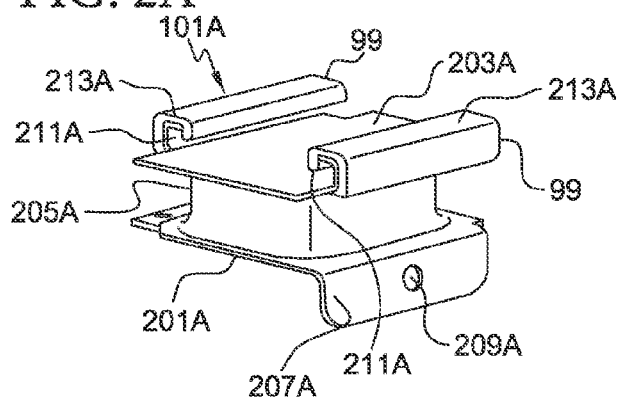
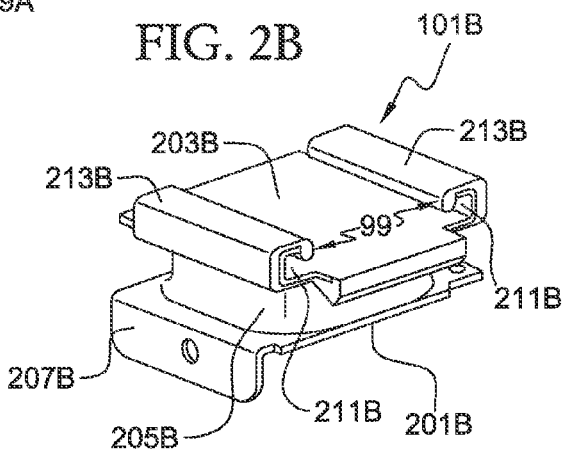
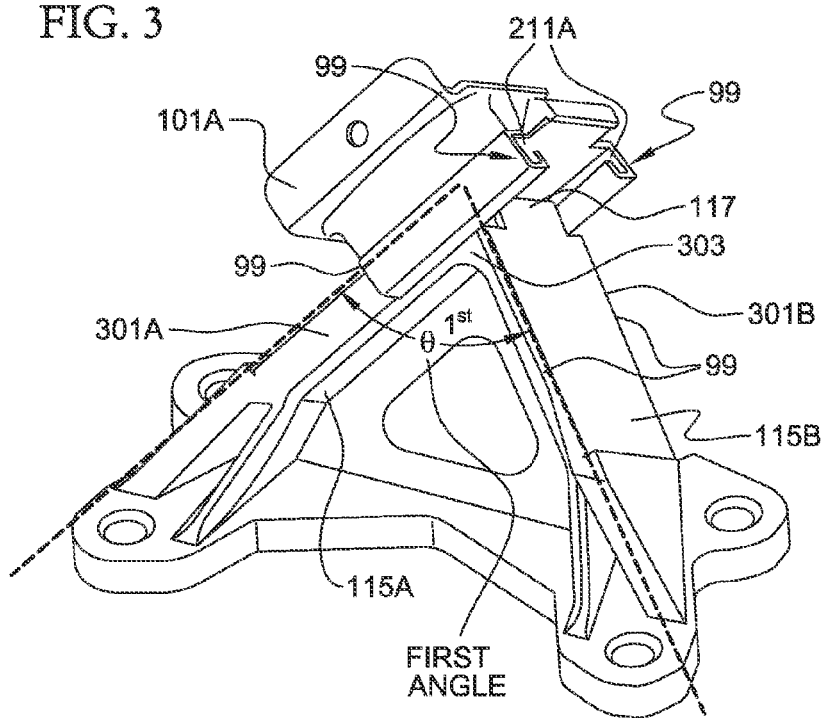

ENGINE MOUNT AND ELASTOMERIC ELEMENT THEREOF

This application claims the priority benefit to and incorporates by reference Chinese Patent Application No. 200510002169.1 "Engine Mount and Elastomeric Element Thereof" by Peter D. Howorth, and Gary Li, filed on Jan. 14, 2005 by Lord Corporation with The State Intellectual Property Office of China and Chinese Utility Model Application No. 200520000871.X "Engine Mount and Elastomeric Element Thereof" by Peter D. Howorth, and Gary Li, filed on Jan. 14, 2005 by Lord Corporation with The State Intellectual Property Office of China.

BACKGROUND

1. Field of the Invention

The present invention relates to an elastomeric mount of the type used to support and isolate an engine from a vehicle chassis.

2. Background of the Invention

In applications involving on- and off-highway equipment, elastomeric mounts must be rugged to take the pounding from traversing unimproved roads. In addition, these mounts should be designed to avoid total disconnect of the power train from the support in the event of elastomer failure (i.e., they are safely tied). Finally, the provision of snubbing in all three orthogonal directions protects the power train, improves subjective ride quality and reduces unwanted chatter caused by metal-to-metal contact.

There is a need for an effective and economical means for making isolation mounts for vehicle engine drive system applications and use. There is a need for economically feasible engine isolation mounts with improved vehicle performance. There is a need for a robust isolation mount system and method of making a vehicle engine mount.

OBJECT OF THE INVENTION

Therefore, it is an object of the present invention to provide an improved isolation mount, the manufacture of which can be simplified, or at least provide the public with a useful choice.

It is a further object of the present invention to provide an improved elastomeric member for the isolation mount, the manufacture of which can be simplified, or at least provide the public with a useful choice.

SUMMARY OF THE INVENTION

According to an aspect of the present invention, an isolation mount for supporting and isolating one part from another includes an inner member formed to be connected to one of the parts and an outer member formed to be connected to one of the parts. The inner member has a first and a second inner plates being connected at one end and extending at a first angle $\theta_{1st}$ with respect to each other; the outer member also has a first and a second outer plates being connected at one end and extending at a second angle $\theta_{2nd}$ with respect to each other. The isolation mount further includes a first and a second individual elastomeric element compressed between and respective inner and outer plates.

According to another aspect of the present invention, an elastomeric member sandwiched between an inner and an outer member of an isolation mount is provided. The isolation mount is to support and isolate one part from another, the inner member is formed to be connected to one of the parts and has a first and a second inner plate being connected at one end and extending at a first degree to each other, and the outer member is formed to be connected to one of the parts and has a first and a second outer plate being connected at one end and extending at a second degree to each other. The elastomeric member includes a first and a second individual elastomeric element compressed between and respective inner and outer plates.

Preferably, each individual elastomeric element is slidably mounted to its respective inner plate.

According to a further aspect of the present invention a method of making an isolation mount for supporting and isolating one part from another includes: providing an inner member which is formed to be connected to one of the parts and has a first and a second inner plate being connected at one end and extending at a first angle $\theta_{1st}$ with respect to each other, providing an outer member which is formed to be connected to one of the parts and has a first and a second outer plate being connected at one end and extending at a second angle $\theta_{2nd}$ with respect to each other, providing an individual elastomeric member element, said individual elastomeric member element formed from an elastomer mold bonded between a first metal plate and a second metal plate, and compressing and sandwiching said individual elastomeric member element between the inner member first inner plate and the outer member first outer plate.

The invention includes a vehicle isolation mount for supporting and isolating a vehicle engine power train drive system part from another vehicle chassis part. The invention includes an inner member formed to be connected to one of the parts, the inner member having a first and a second inner plate being connected at one end and extending at a first angle $\theta_{1st}$ with respect to each other, the inner member having a third and a fourth inner plate being connected at one end and extending at a second angle $\theta_{2nd}$ with respect to each other. The invention includes an outer member formed to be connected to one of the parts, the outer member having a first and a second outer plate being connected at one end and extending at a third angle with respect to each other, the outer member having a third and a fourth outer plate being connected at one end and extending at a fourth angle with respect to each other. The isolation mount includes a first individual elastomeric element compressed between the first inner plate and the first outer plate, a second individual elastomeric element compressed between the second inner plate and the second outer plate, a third individual elastomeric element compressed between the third inner plate and the third outer plate, and a fourth individual elastomeric element compressed between the fourth inner plate and the fourth outer plate.

The invention includes a vehicle engine power train drive system isolation mount elastomeric sandwich member for sandwiching between an inner and an outer member of an isolation mount. The elastomeric sandwich member is comprised of an individual elastomeric element for compression between a first inner plate of the isolation mount inner member and a first outer plate of the isolation mount outer member, with the individual elastomeric element slidably mountable to the first inner plate of the isolation mount inner member.

The invention includes a method of making a vehicle engine power train drive system isolation mount for supporting and isolating a vehicle engine power train drive system part from a vehicle chassis part. The method includes providing an inner member with at least a first and a second inner plate. The method includes providing an outer member with at least a first and a second outer plate. The method includes providing a plurality of individual elastomeric member elements formed from elastomers mold bonded between individual elastomeric member element rigid plates. The method includes selecting a first individual elastomeric member element and selecting a second individual elastomeric member element. The method includes disposing the selected first individual elastomeric member element in compression between the inner member first inner plate and the outer member first outer plate and disposing the selected second individual elastomeric member element in compression between the inner member second inner plate and the outer member second outer plate to provide the isolation mount for supporting and isolating the vehicle engine power train drive system part from the vehicle chassis part.

The invention includes a method of making a vehicle engine power train drive system isolation mount for supporting and isolating a vehicle engine power train drive system part from a vehicle chassis part. The method includes providing an inner member having at least a first and a second inner plate and providing an outer member having at least a first and a second outer plate. The method includes providing a plurality of slidably mountable individual elastomeric member elements divided into at least a first slidably mountable individual elastomeric member element group with the first slidably mountable individual elastomeric member element group elastomeric member elements substantially identical, and divided into at least a second slidably mountable individual elastomeric member element group with the second slidably mountable individual elastomeric member element group elastomeric member elements substantially identical, with the second slidably mountable individual elastomeric member element group different from the first slidably mountable individual elastomeric member element group. The method includes selecting at least two desired slidably mountable individual elastomeric member elements from either the first group or the second group, and slidably mounting a first one of said selected at least two desired slidably mountable individual elastomeric member elements between the first inner plate and the first outer plate, and slidably mounting a second one of the selected at least two desired slidably mountable individual elastomeric member elements between the first inner plate and the first outer plate.

Preferably the invention provides modular mount components for designing and manufacturing a multitude of different engine mount configurations and performances. Preferably the invention provides a method of making a plurality of different types of vehicle engine power train drive system isolation mounts. Preferably the invention provides modular mount components which are used to assemble a plurality of different engine mounts with different desired technical specifications. The invention provides for manufacturing more than one type of engine mount with modular mount components including individual elastomeric member elements formed from an elastomer mold bonded between first metal plate and second metal plates. The invention provides a manufacturing and testing process for engine mounts with increased production with minimal rework. Further, it is desirable to provide a method for coupling, supporting, and isolating an isolation mount inner member and an isolation mount outer member. Preferably the invention provides modular mount common components in the different engine mounts which can be easily utilized in assembling more than one engine mount. The invention includes a method of making n different types of vehicle engine power train drive system isolation mounts with n being equal to or greater than 2. The method includes providing a plurality of slidably mountable individual elastomeric member elements formed from a plurality of elastomers mold bonded to a plurality of individual elastomeric member element rigid plates, with the rigid plates including a pair of opposing corresponding elongated sliding channel rail mating members. The method includes providing a first inner member having at least a first and a second plate, and providing a first outer member having at least a first and a second plate, slidably mounting a first individual elastomeric member element and a second individual elastomeric member element to said first inner member to provide a first type of said isolation mounts. The method includes providing a second inner member having at least a first and a second plate, and providing a second outer member having at least a first and a second plate, slidably mounting a third individual elastomeric member element and a fourth individual elastomeric member element to the second inner member to provide a second type of said isolation mounts, with the second type of the isolation mount different from the first type.

Other aspects and advantages of the invention will become apparent from the following detailed description, taken in conjunction with the accompanying drawings, which description illustrates by way of example the principles of the invention. It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIGS. 2A and 2B each illustrates an elastomeric element of the isolation mount of FIG. 1;

FIG. 3 illustrates assembly of an elastomeric element of FIG. 2A or 2B onto an inner member of the isolation mount of FIG. 1;

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings. Reference will now be made in detail to the present preferred embodiments of the invention, examples of which are illustrated in the accompanying drawings.

Figure 1A:
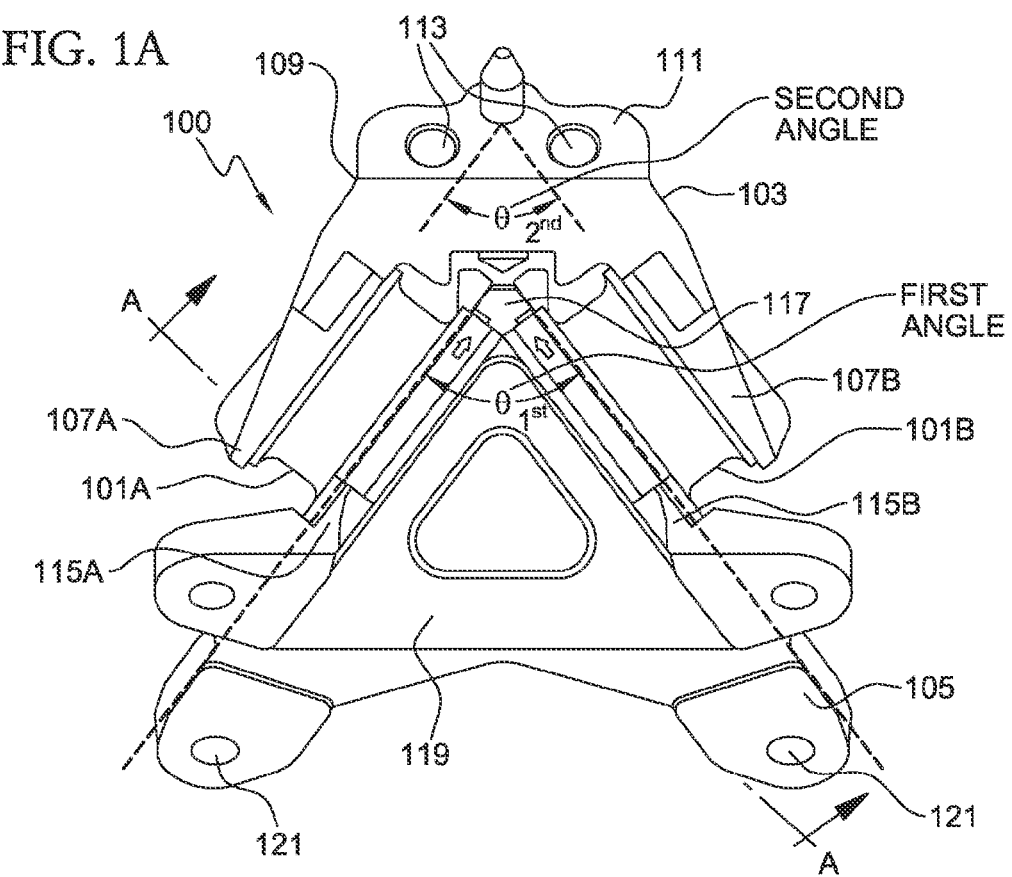
FIG. 1A is a perspective view of an isolation mount according to an exemplary embodiment of the present invention.
Figure 1B:
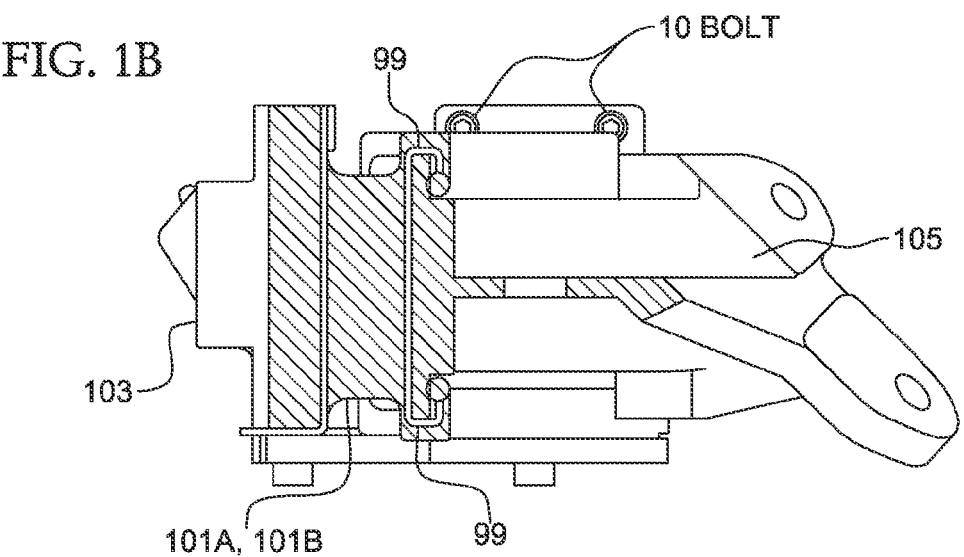
FIG. 1B is a cross-sectional view of the mount of FIG. 1A along line A-A'.
Figure 4:
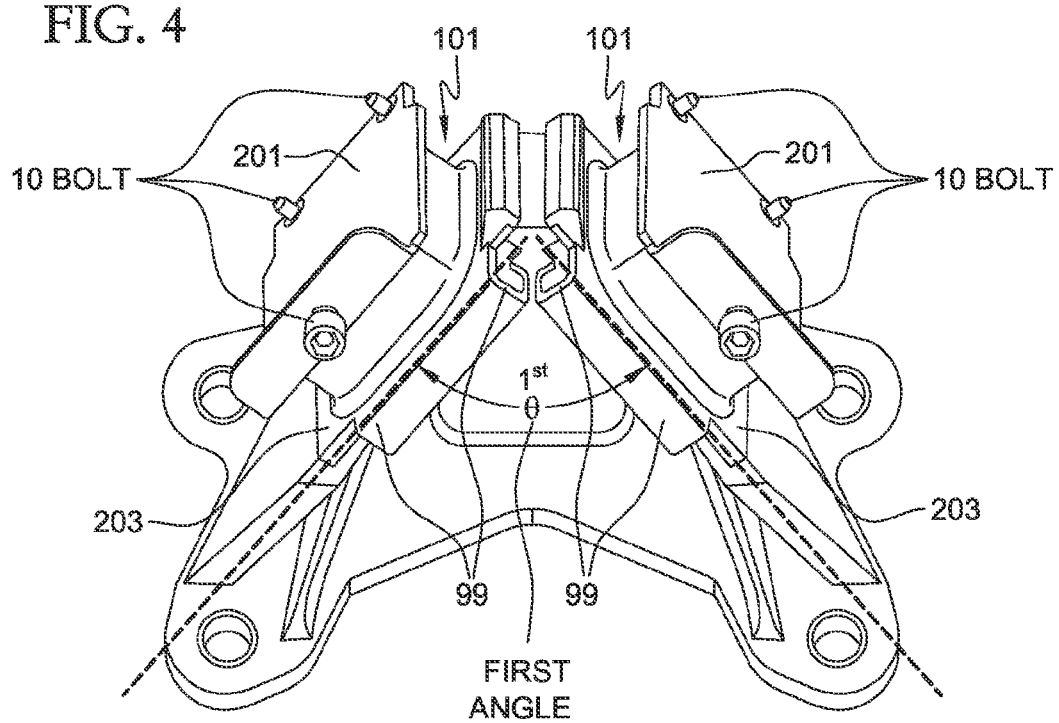
FIG. 4 illustrates both elastomeric elements assembled to the inner member.
Figure 5:
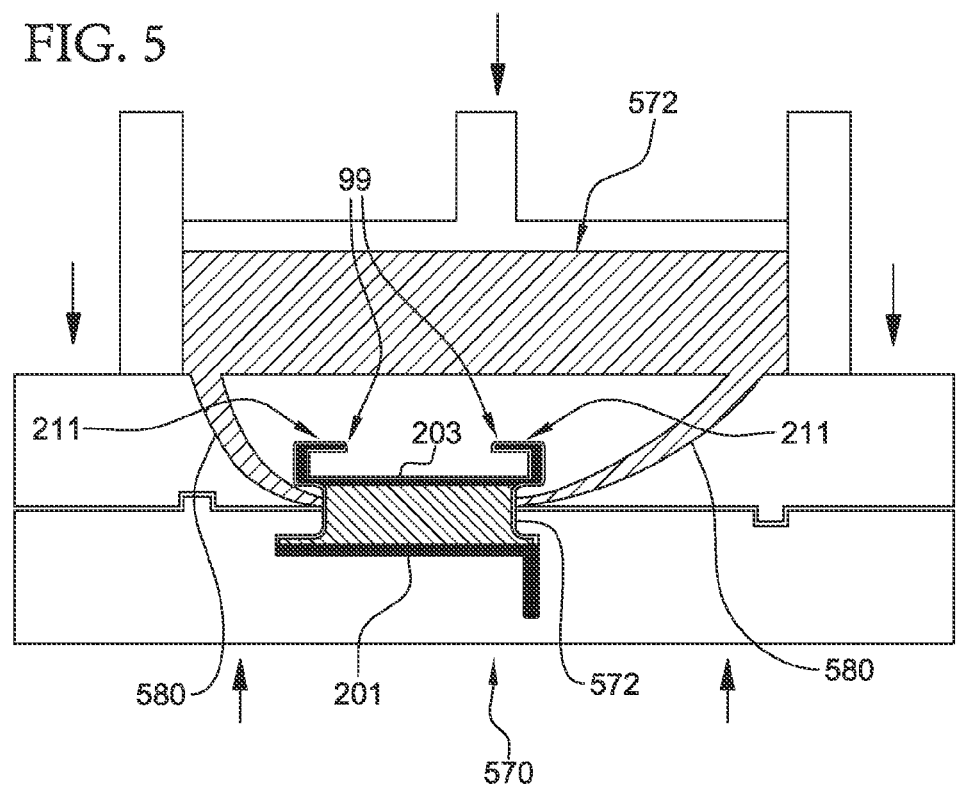
FIG. 5 illustrates molding of the elastomeric element of FIG. 2B.
Figure 6A:
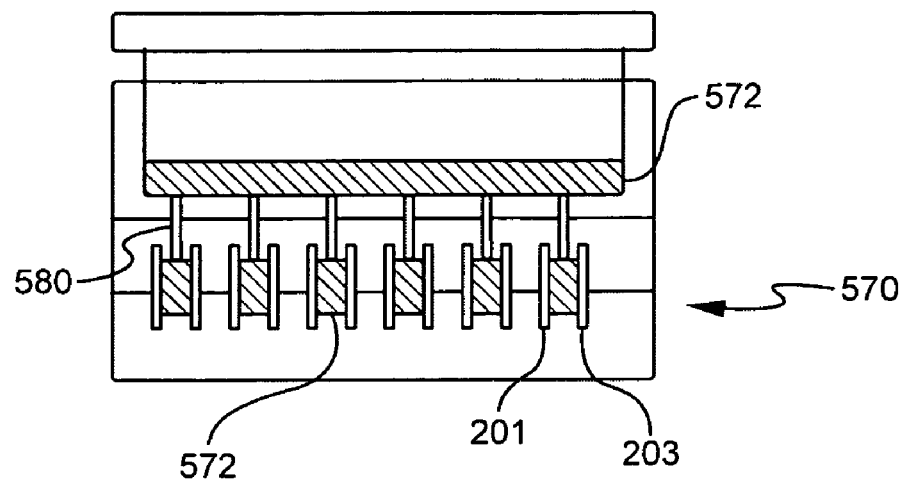
FIGS. 6A and 6B illustrates molding of the elastomeric elements of FIG. 1-5, 8-9.
Figure 6B:
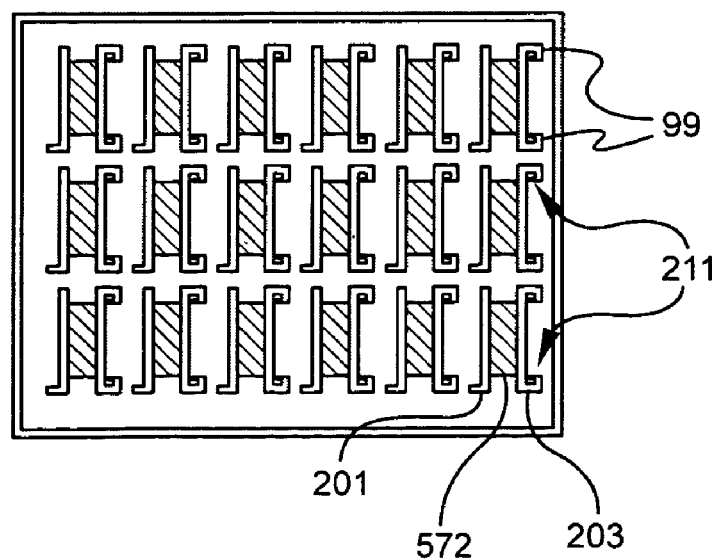
Figure 7A:
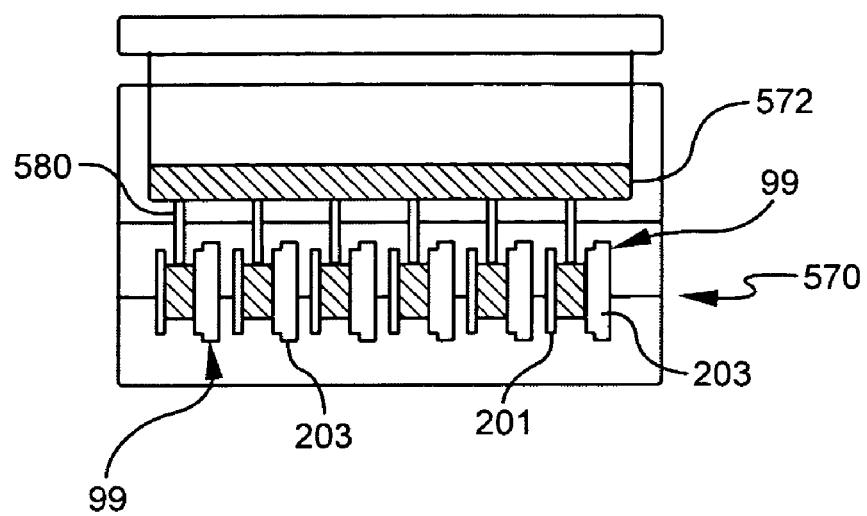
FIGS. 7A and 7B illustrates molding of the elastomeric elements of FIG. 10-14.
Figure 7B:
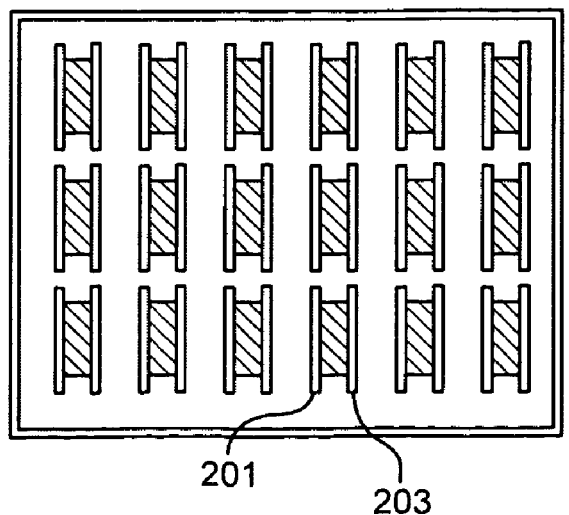
Figure 8A:
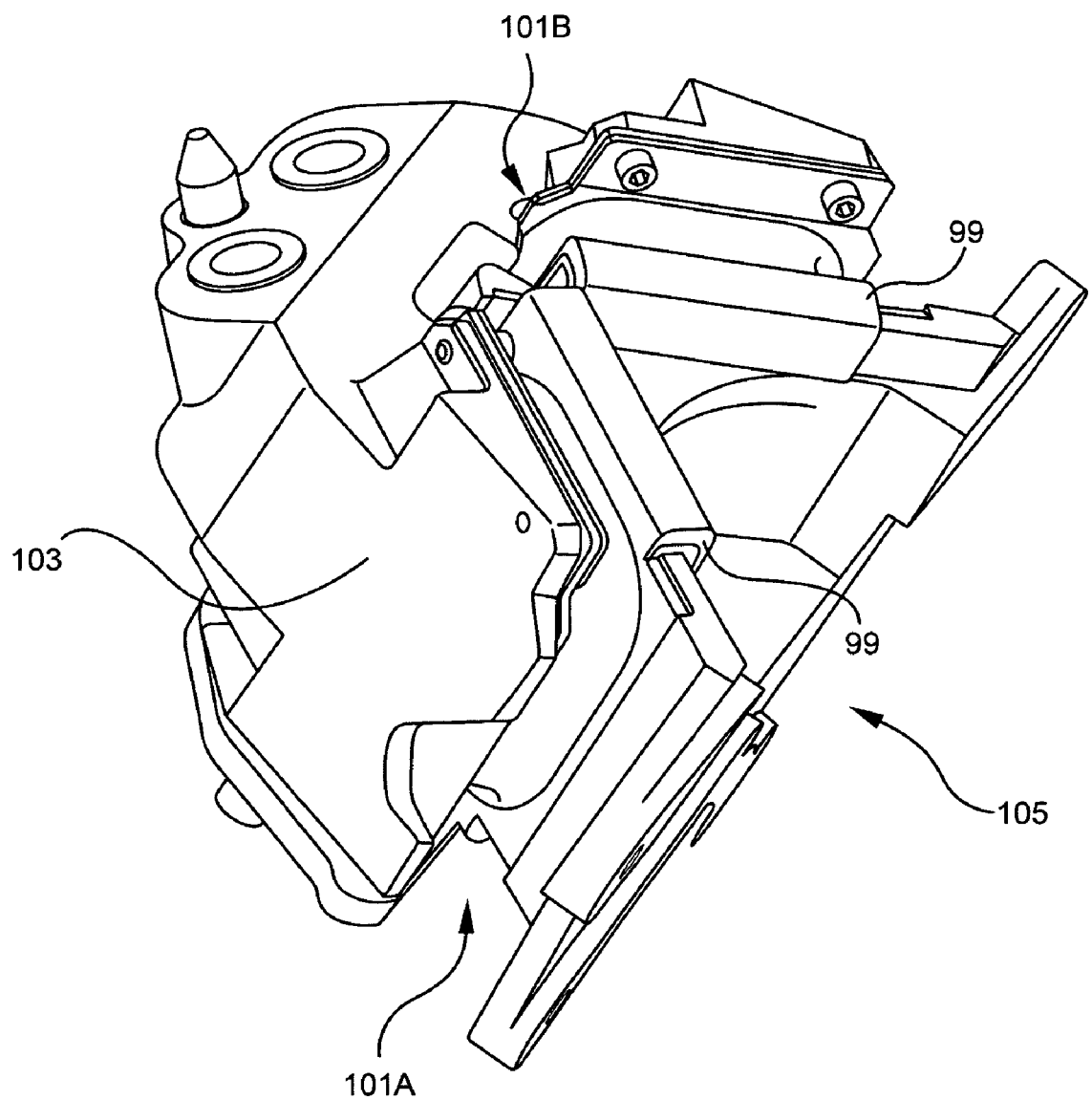
FIGS. 8A, 8B, 8C, and 8D illustrate views of an isolation mount.
Figure 8B:
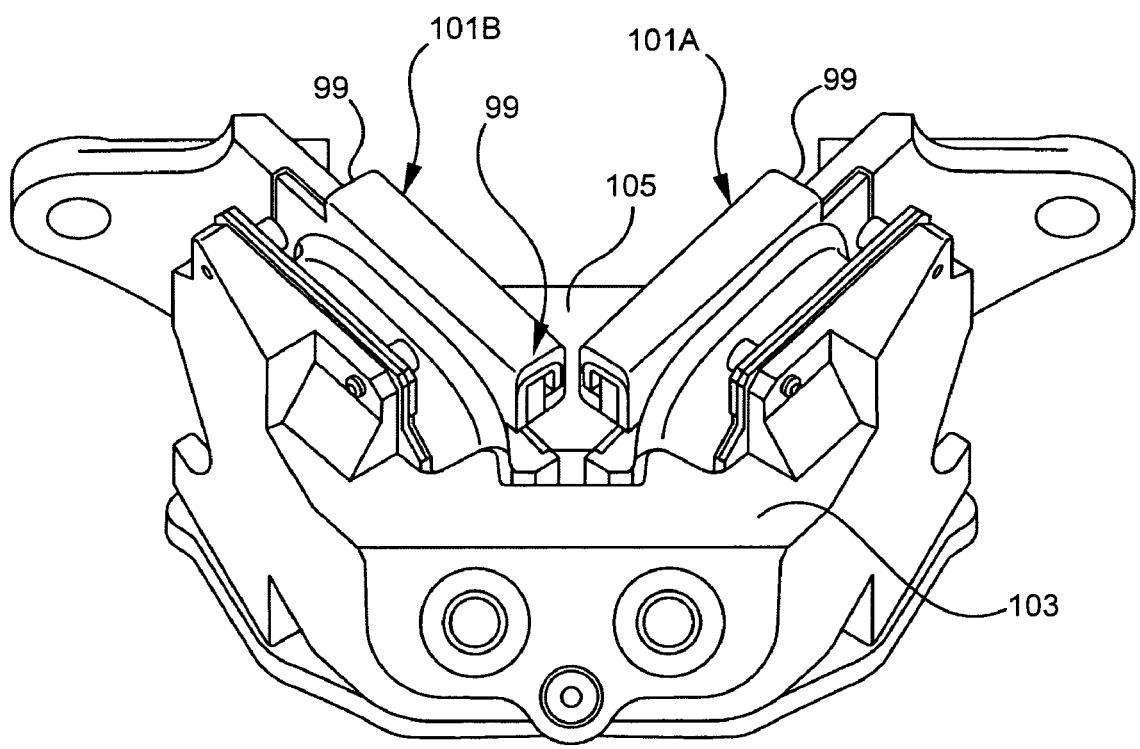
Figure 8C:
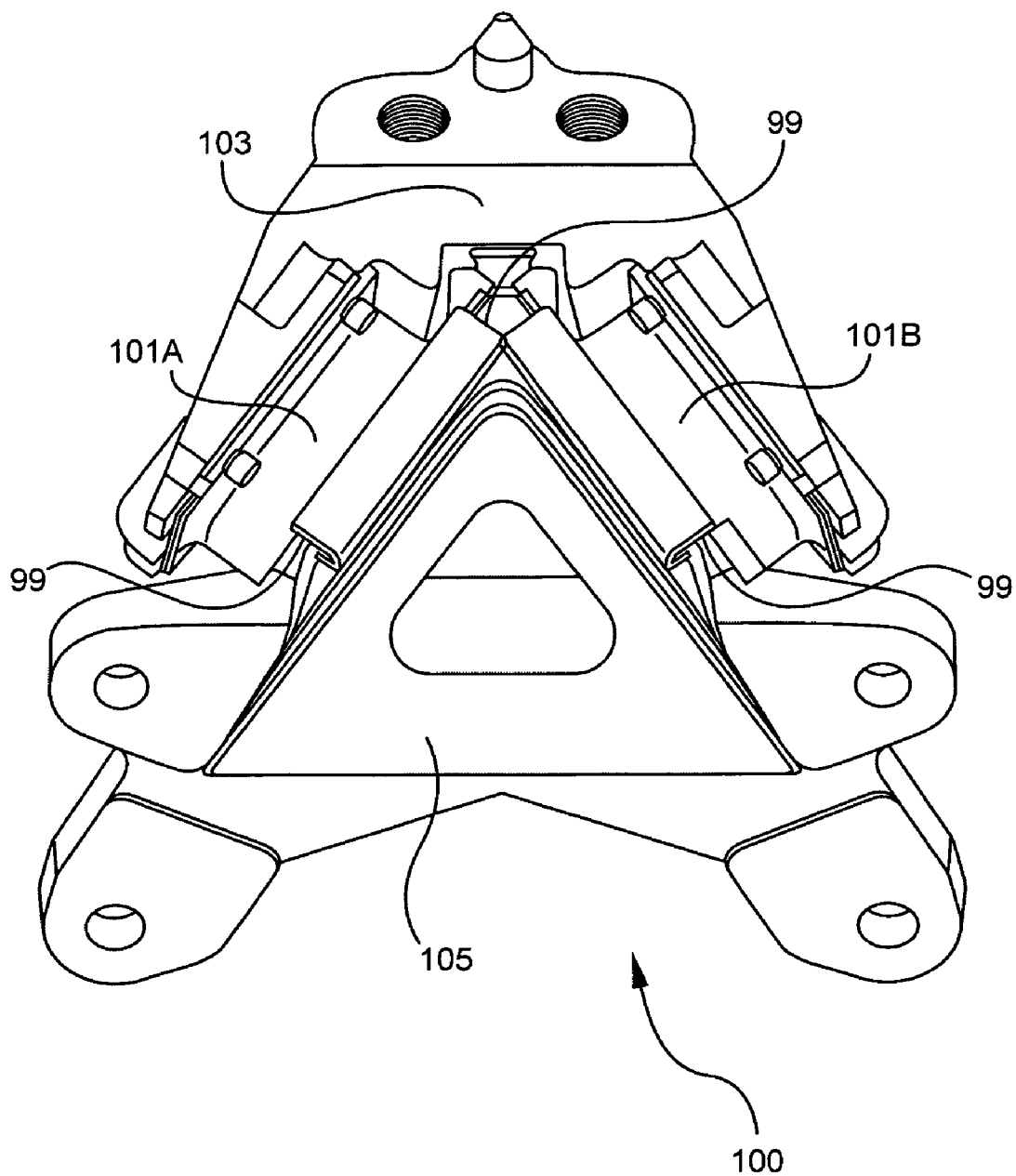
Figure 8D:
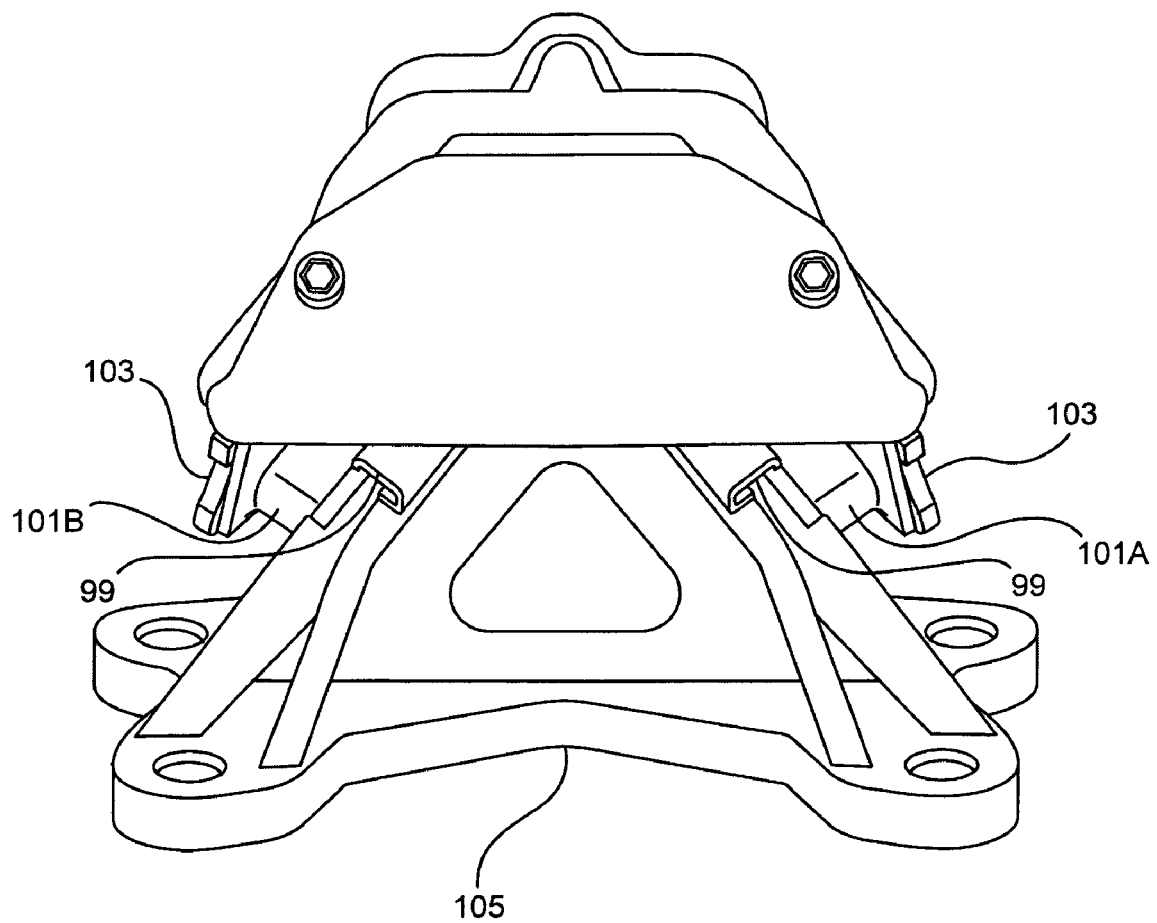

As shown in FIGS. 1A and 1B, an exemplary engine mount 100 according to an embodiment of the present invention includes a pair of individual elastomeric elements 101A, 101B pre-loaded in compression between outer and inner members 103 and 105 to form a V-configuration like mount. In the current application, the pair of individual elastomeric elements 101A, 101B can also be generally referred as an elastomeric member. Additional views of an exemplary engine mount 100 are shown in FIGS. 8A-8D with inner and outer engine mount members 103, 105 assembled together with slidably mounted individual elastomeric elements 101A, 101B.

Outer member 103 has a pair of outer plates 107A, 107B projecting from a generally rectangular base 109 and diverging symmetrically from and at an angle to each other. Suitable angles are determined dependent upon a supporting structure such as a vehicle and engine drive system (not shown), to which the engine bracket outer member 103 is mounted, as could be generally understood by the people in the art. Flange 111 at a corner of base 109 includes holes 113 extending therethrough for receiving bolts on the vehicle engine drive system which is to be isolated from the vehicle supporting structure chassis.

Inner member 105 also has a pair of inner plates 115A, 115B projecting from a joint 117 at one end of the inner plates and extending substantially parallel to the respective outer plates 107A, 107B. The other ends of the inner plates 115A, 115B are joined by yet another plate 119 such that the inner member 105 exhibits a solid triangle configuration. Elongate hole 121 extends through inner member 105 receiving a connecting fixture or bolt for attachment to the vehicle supporting structure chassis.

Inner and outer members 103 and 105 are preferably castings of high strength ductile iron or aluminum for strength and durability. Each individual elastomeric element 101A, 101B has a generally cuboid shape as shown in FIGS. 2A and 2B. The top and bottoms surfaces of each elastomeric element are planarly abutting and contiguous with respective outer and inner plates respectively, when the engine mount is assembled as shown in FIGS. 1A and 1B. The fact that the elastomeric elements 101A, 101B are independent from each other may allow relatively easy assembly of the engine mount 100 and thereby may benefit the manufacture efficiency of the engine mount 100. Furthermore, the relatively simple configuration of the elastomeric element 101A, 101B may increase the capacity of the fabricating process in the molding press and consequently the manufacture efficiency of the engine mount 100 as well. Preferably the elastomeric elements 101 have a substantially parallel planar plate orientation, with the elastomer bonded between its two substantially planar rigid metal plates with a parallel planar plate orientation to provide a planar plate sandwich configuration, with the elastomeric elements 101 slidably mountable.

Preferably the V-configuration, which the engine mount 100 utilizes, provides and assists in obtaining an appropriate ratio of stiffness of the engine mount in order to reduce vibration.

In FIGS. 2A and 2B, each elastomeric element 101A, 101B has an elastomeric component 205A, 205B of a simple configuration, i.e., a generally cuboid shape in the exemplary embodiment, and a top and a bottom rigid nonelastomeric metal plate 201A, 201B, 203A, 203B respectively bonded to the top and bottom of each respective elastomeric component 205A, 205B. Components 205A, 205B may be made of an elastomer, such as a natural rubber, neoprene, Buna, nitrile, and so on to provide soft vertical and lateral nominal spring rates with a stiffness ratio.

Preferably the elastomeric component 205A, 205B are mold bonded to the top and a bottom metal plate 201A, 201B, 203A, 203B in an elastomer press mold, preferably with a rubber to metal bonding adhesive ensuring the bonding of the elastomer to the metal plates. Preferably the elastomeric component 205A, 205B are a mold bonded elastomeric block components with the elastomer bonded to the rigid top and a bottom metal plate 201A, 201B, 203A, 203B during the molding of the elastomer 572 to the rigid metal top and a bottom metal plate members 201A, 201B, 203A, 203B with a rubber to metal bonding agent in an elastomer press mold 570 that accepts the substantially planar rigid metal plate members such as shown in FIGS. 5-7B. Preferably the elastomer press mold 570 receives the substantially rigid metal plate member 201 and 203 with the rigid plate members planes oriented substantially parallel, with the rigid plate members including their already formed opposing corresponding elongated sliding channel rail mating members 99, such as elongated channels 211. Preferably the method of making the engine mount 100 includes providing an elastomeric element mold 570 for receiving the nonelastomeric rigid metal top and bottom metal plate members, providing an elastomer 572, and molding the elastomer 572 to the nonelastomeric metal plate members inside the mold 570. Preferably the elastomer 570 is comprised of a natural rubber elastomer. In embodiments such as shown in FIGS. 5-7B molding in the mold includes providing the elastomer 572 as an elastomer transfer stock 572, and transferring the elastomer transfer stock 572 under a pressure into the mold 570, such as through a sprue 580 with the mold 570 comprising close fitting steel metal pieces pressed in place, and vulcanizing curing the elastomer 572 inside the mold 570 under a molding pressure, preferably a molding pressure of at least 300 psi, dependent upon the elastomer modulus.

The top and bottom plates 201A, 201B, 203A, 203B, which now define the top and bottom surfaces of the elastomeric element 101A, 101B, have a generally planar rectangular shape. The top and bottom plates 201A, 201B, 203A, 203B are formed from a nonelastomeric rigid material, preferably stamped from a high-strength, cold-rolled steel sheet, grade 80 and, if desired, may be bonded to elastomeric components 205A and 205B with an adhesive such as the Lord Chemlok 205 and Chemlok EP6788-50 rubber to metal bonding system.

In embodiments such as shown in FIGS. 1-6, 8-9 preferably, at one side of each top plate 201A, 201B, a portion of the plate is folded away from the elastomeric component 205A, 205B to form a projection 207A, 207B projecting substantially perpendicular to the direction in which the top plate 201A, 201B extends. Preferably a hole or aperture 209A, 209B is provided on each projection 207A, 207B so as to be bolted with bolts 10 to the respective outer plate 107A, 107B of the outer member 103, preferably to attach and secure the position of the elastomeric element.

Preferably each bottom plate 203 is substantially planar and includes opposing corresponding elongated sliding channel rail mating members 99 for slidably mounting the elastomeric elements 101 to the opposing corresponding elongated sliding channel rail mating members 99 of the inner plates 115. In preferred embodiments the bottom plate's opposing corresponding elongated sliding channel rail mating members 99 are a pair of elongate channels 211A, 211B formed at two opposite sides of the bottom planar plate 203A, 203B for slidably mounting each elastomeric element 101A, 101B onto respective inner plate 115A, 115B, which will be discussed in further details with reference to FIG. 3. The channels are preferably comprised of protruding portion 213A, 213B of the bottom plate 203A, 203B protruding firstly away from the elastomeric component 205A, 205B perpendicularly and then protruding towards each other substantially parallel to the direction in which the bottom plate 203A, 203B extends, with the opposing corresponding elongated sliding channel rail mating channels slidably matable with the corresponding elongated sliding channel rail mating rails of inner plate 115A, 115B.

Figure 9A:
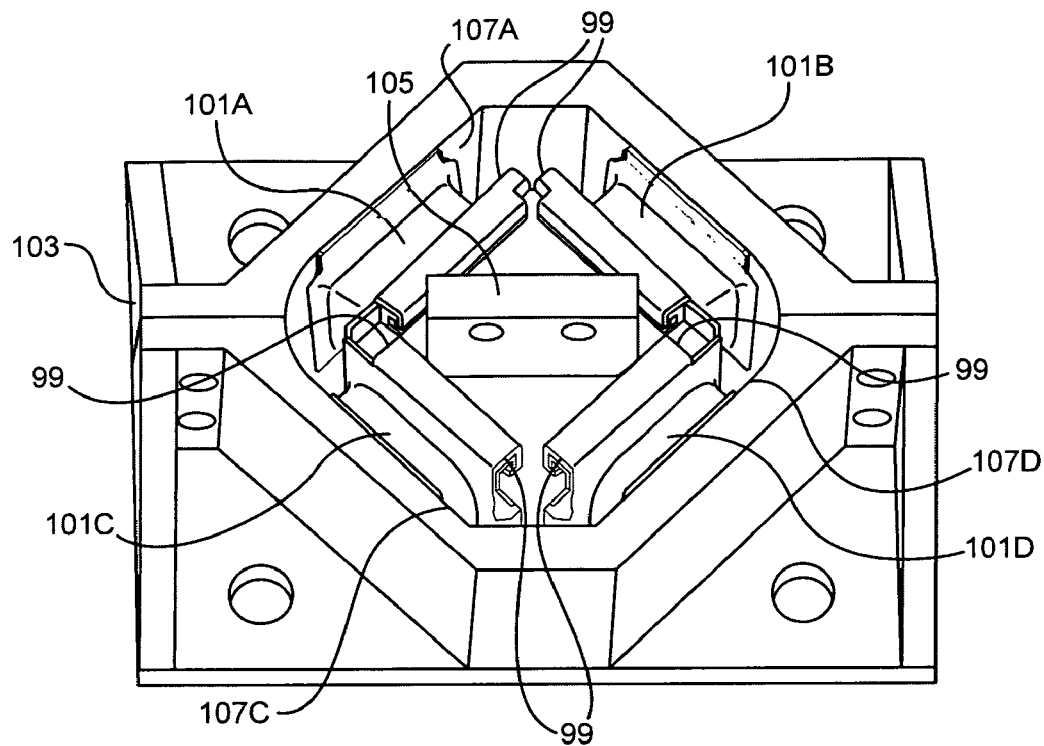
FIGS. 9A and 9B illustrates views of an isolation mount.
Figure 9B:
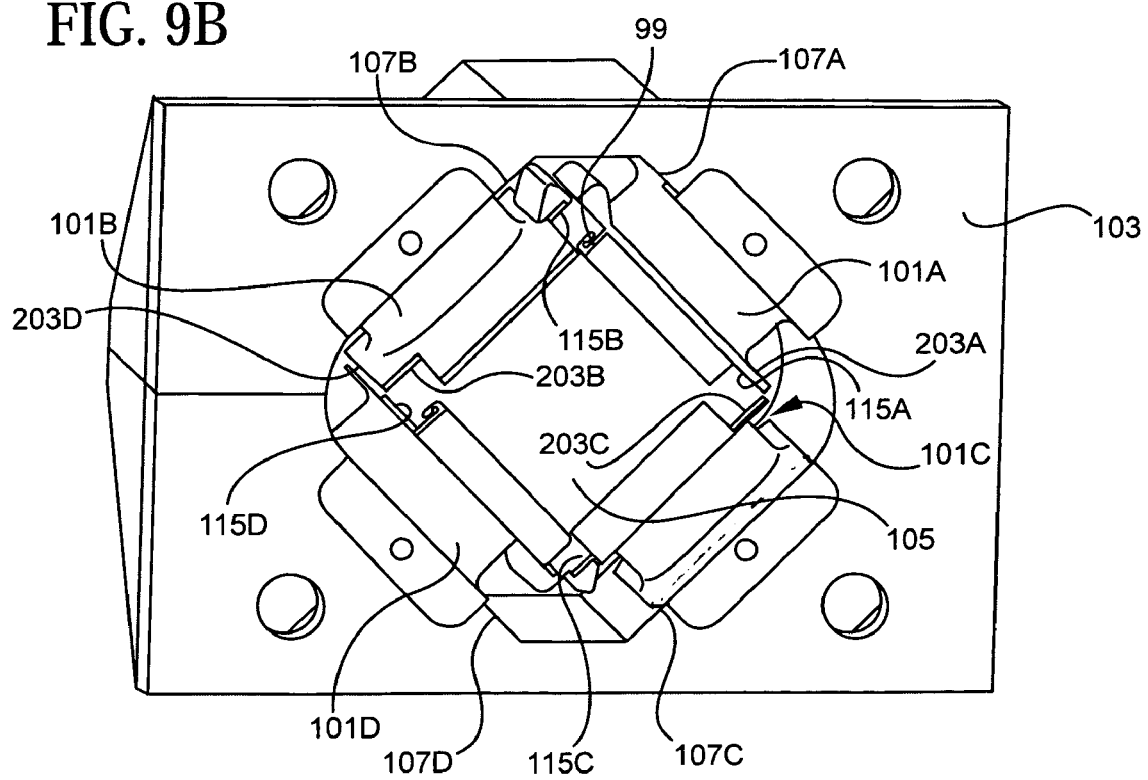
Figure 10A:
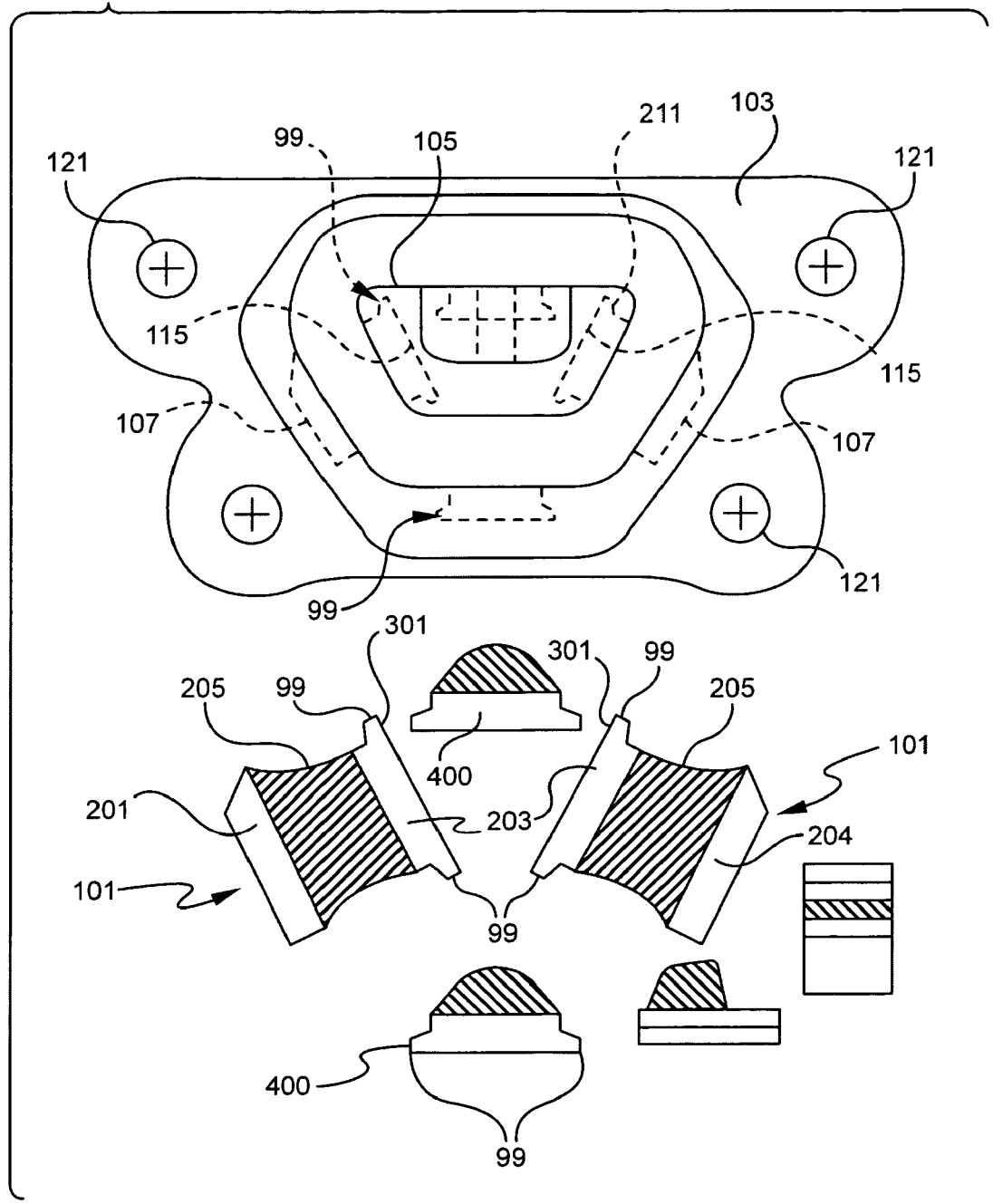
FIGS. 10A, 10B, 10C, 10D, 10E, and 10F illustrate views of an isolation mount according to an exemplary embodiment of the present invention.
Figure 10B:
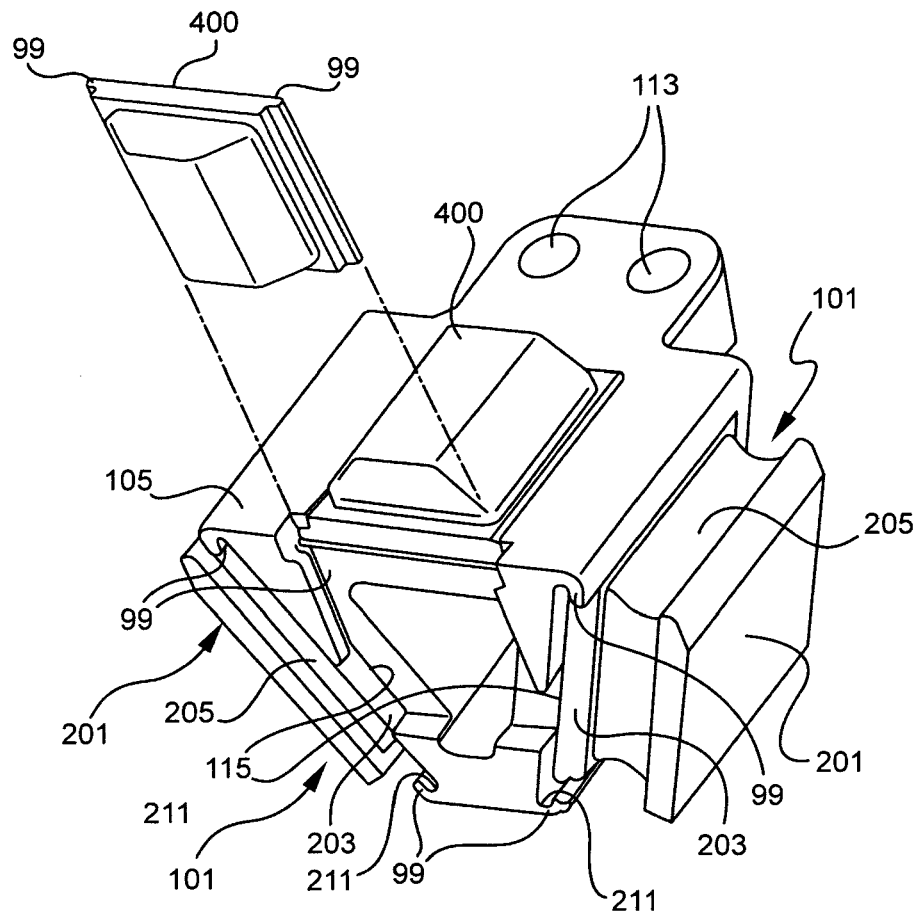
Figure 10C:
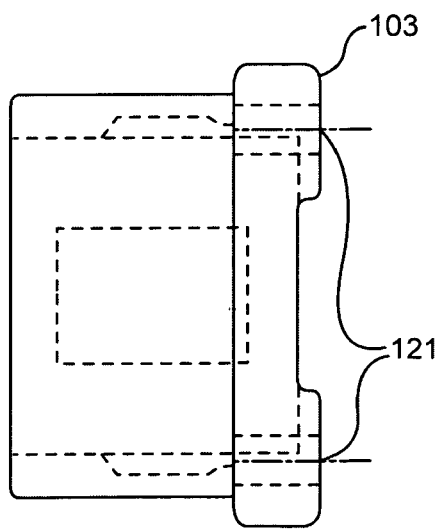
Figure 10D:
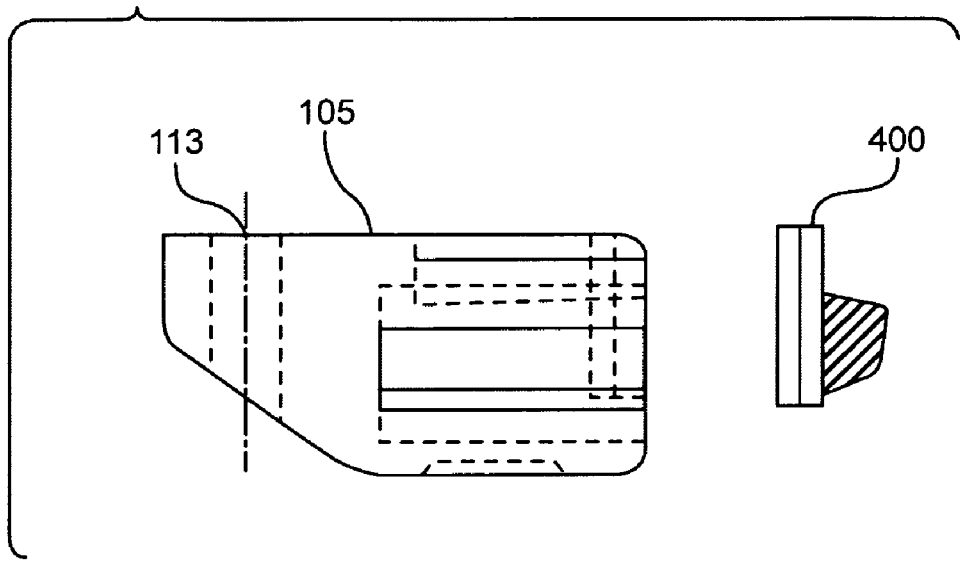
Figure 10E:
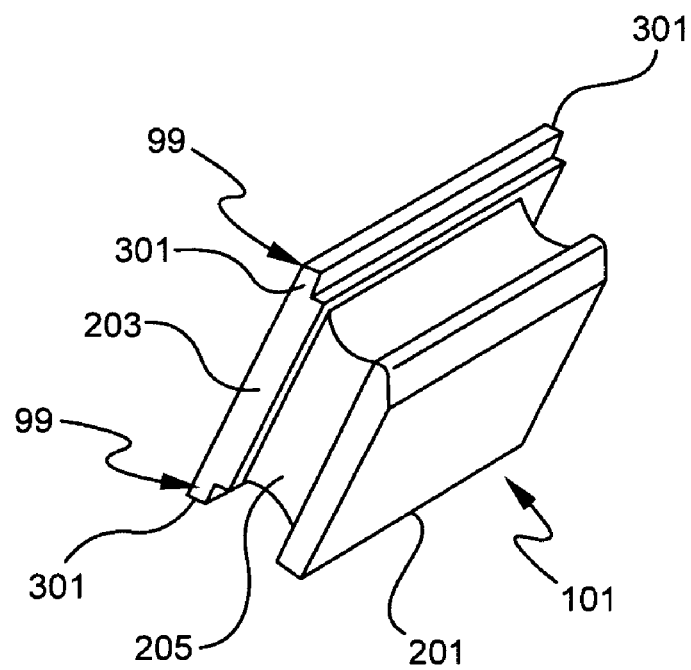
Figure 10F:
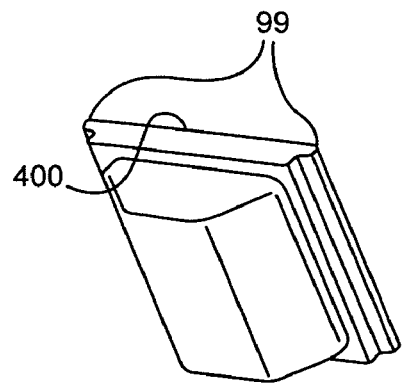
Figure 11A:
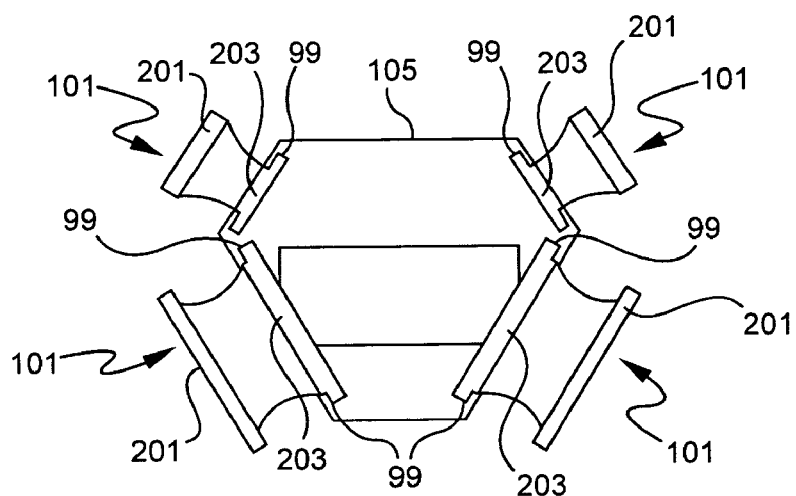
FIGS. 11A, 11B, 11C, 11D, 11E, and 11F illustrate views of an isolation mount with individual elastomeric elements.
Figure 11B:
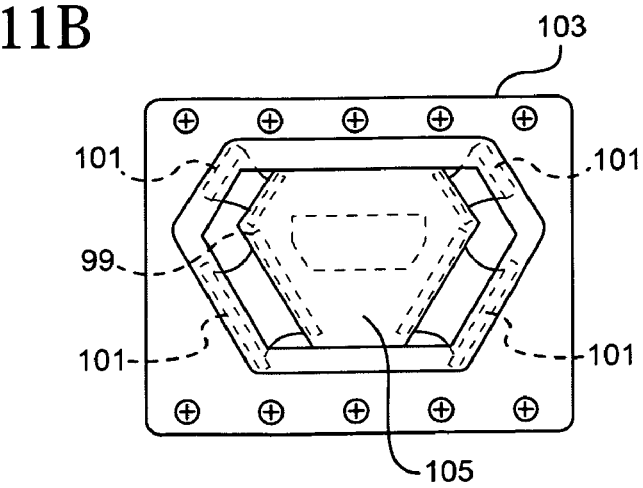
Figure 11C:
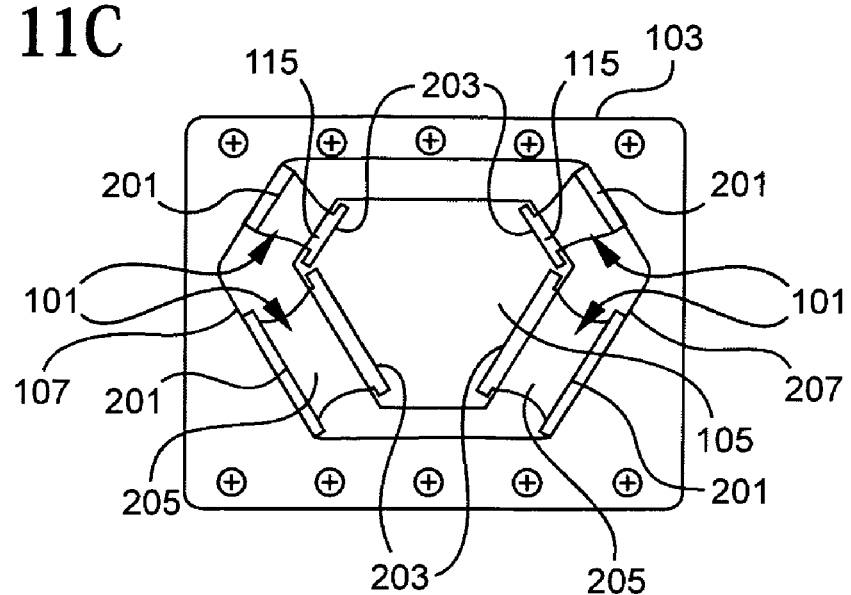
Figure 11D:
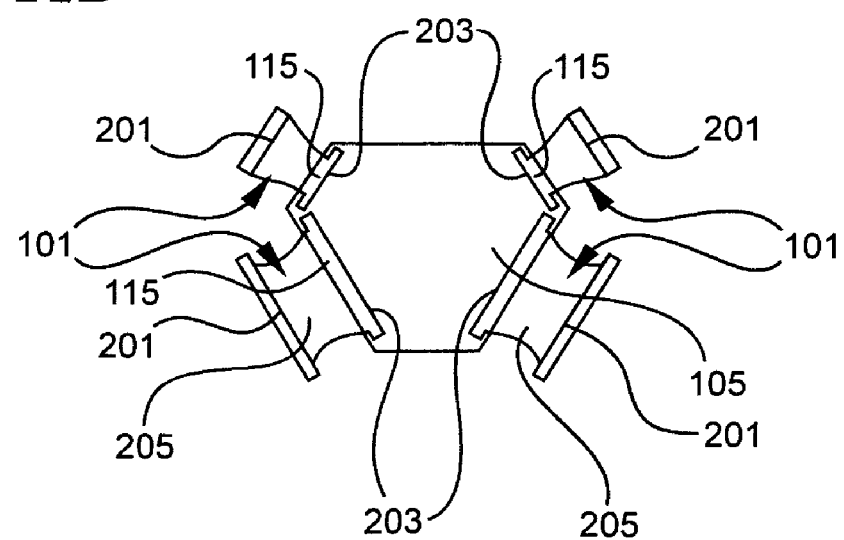
Figure 11E:
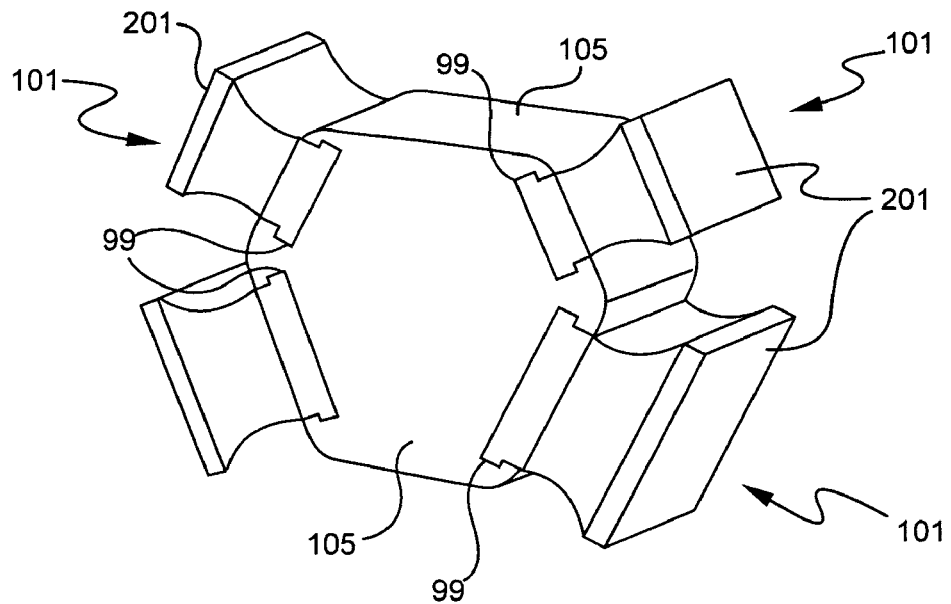
Figure 11F:
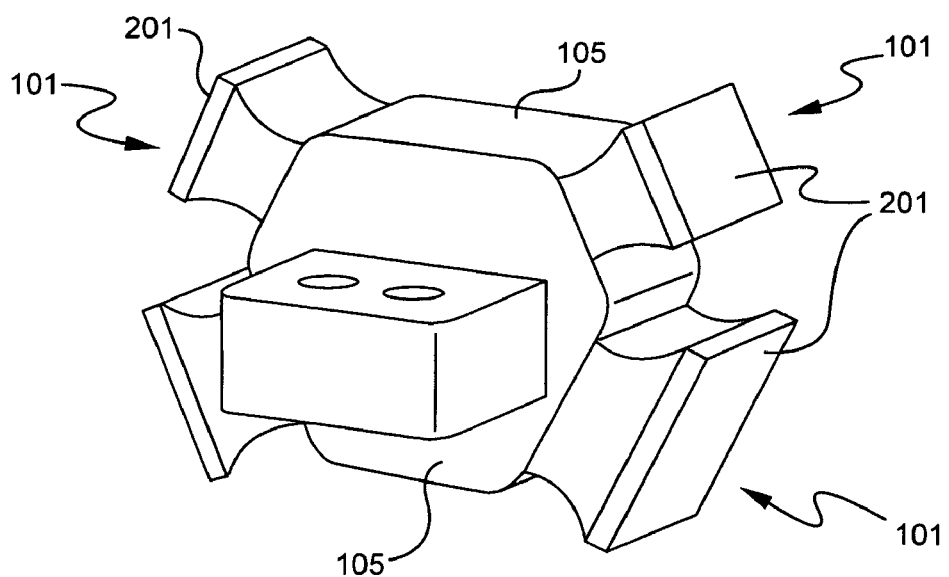
Figure 12A:
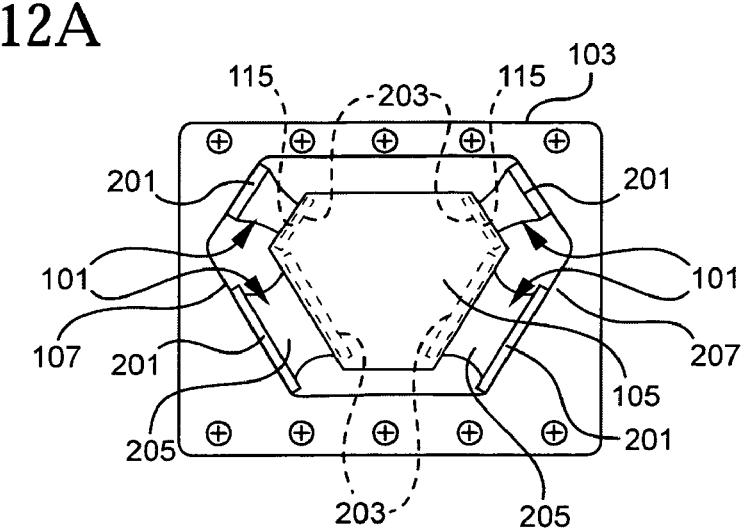
FIGS. 12A, 12B, and 12C illustrate views of an isolation mount with individual elastomeric elements.
Figure 12B:
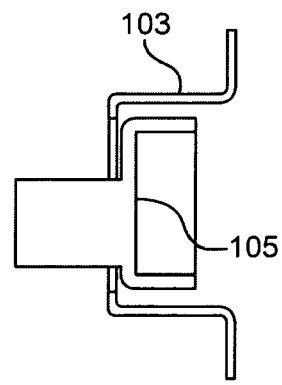
Figure 12C:
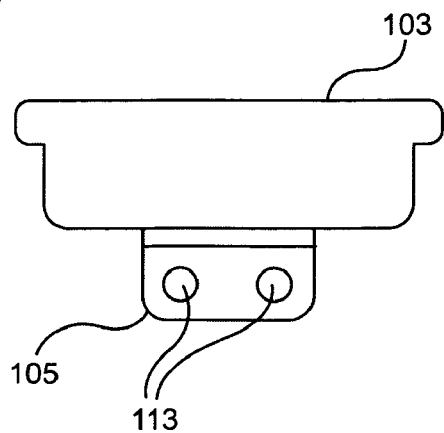
Figure 13A:
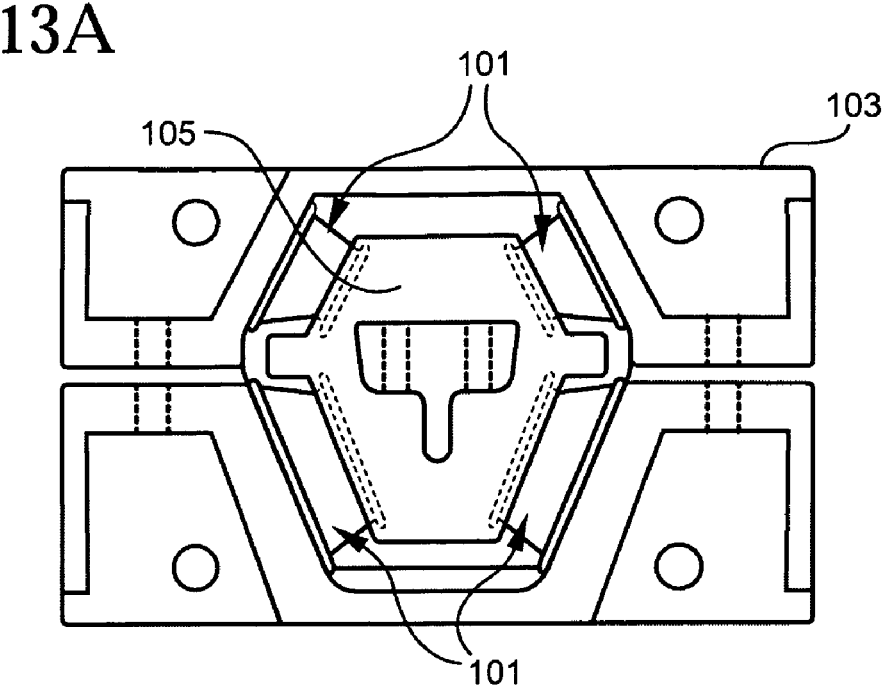
FIGS. 13A, 13B, 13C, 13D, and 13E illustrate views of an isolation mount with individual elastomeric elements.
Figure 13B:
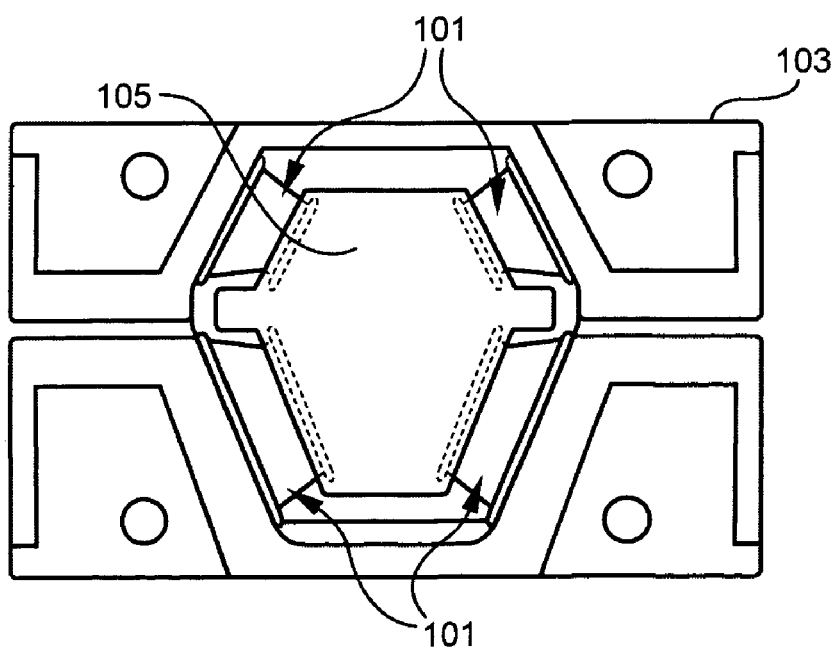
Figure 13C:
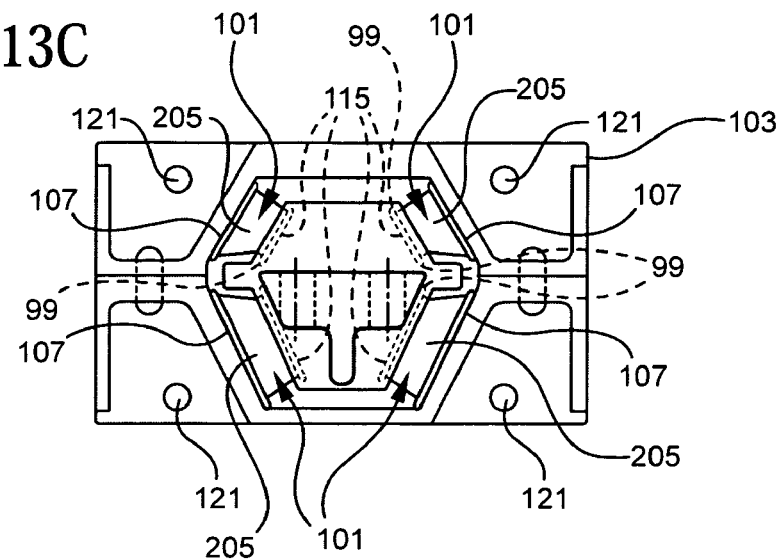
Figure 13D:
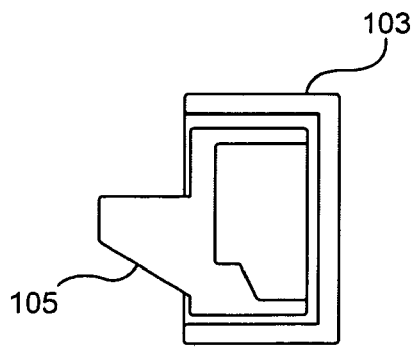
Figure 13E:
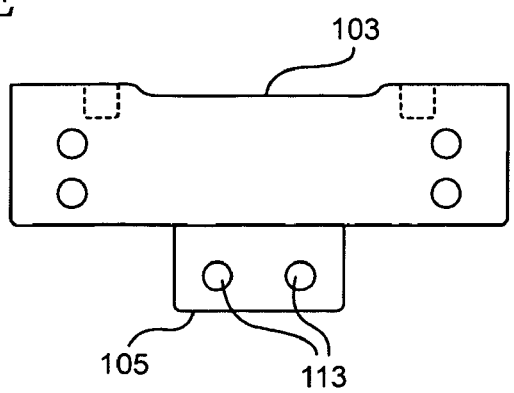
Figure 14A:
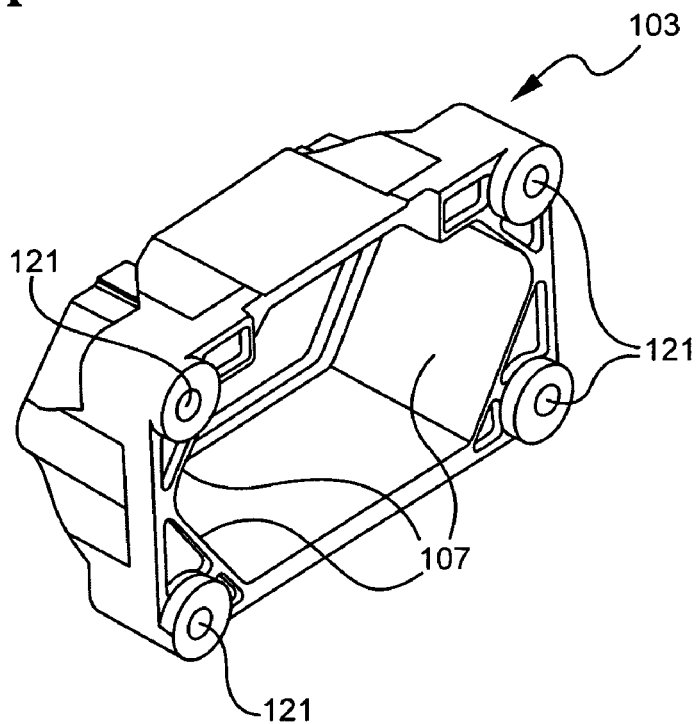
FIGS. 14A, 14B, 14C, 14D, 14E and 14F illustrate views of an isolation mount with individual elastomeric elements.
Figure 14B:
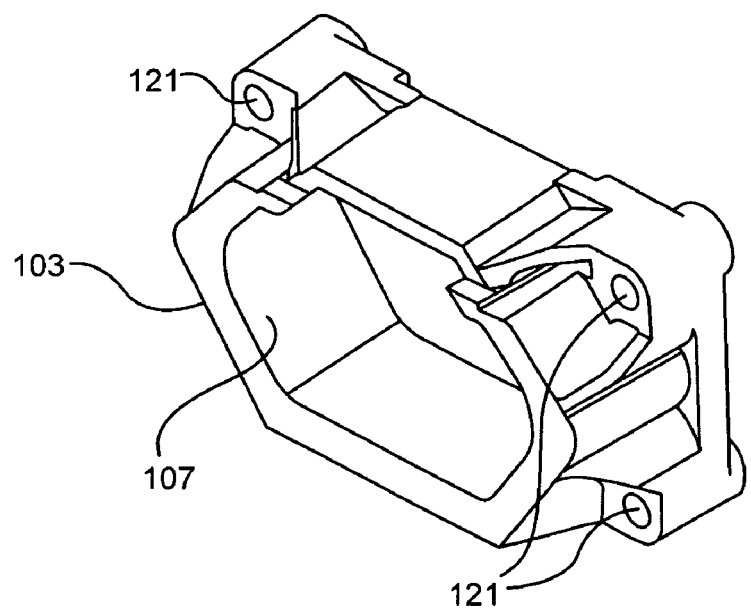
Figure 14C:
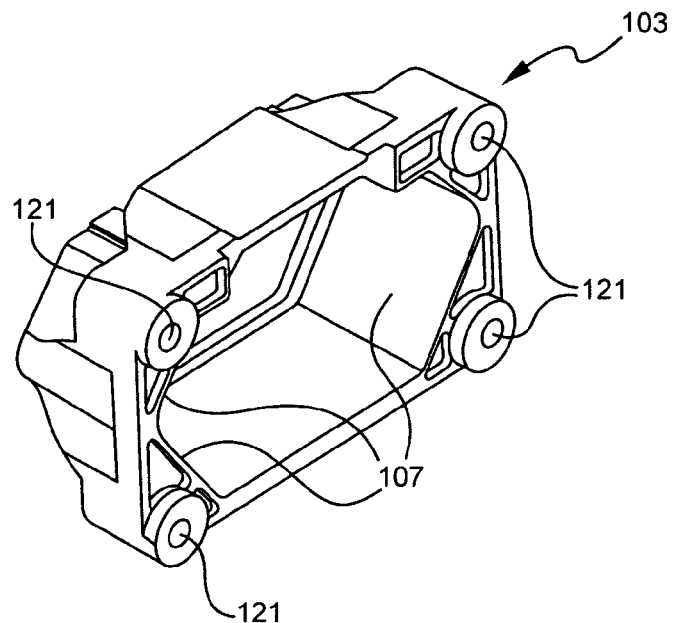
Figure 14D:
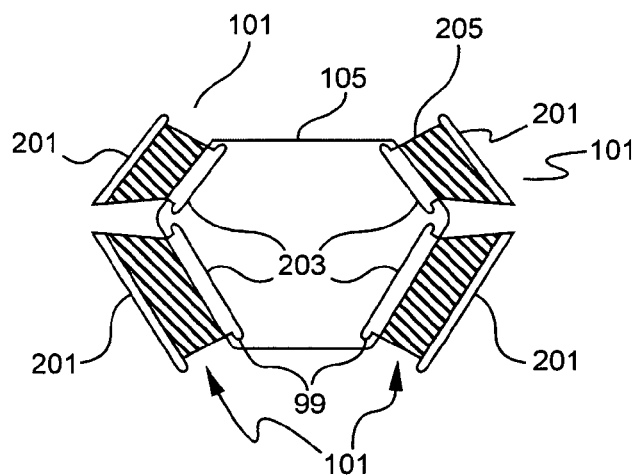
Figure 14E:
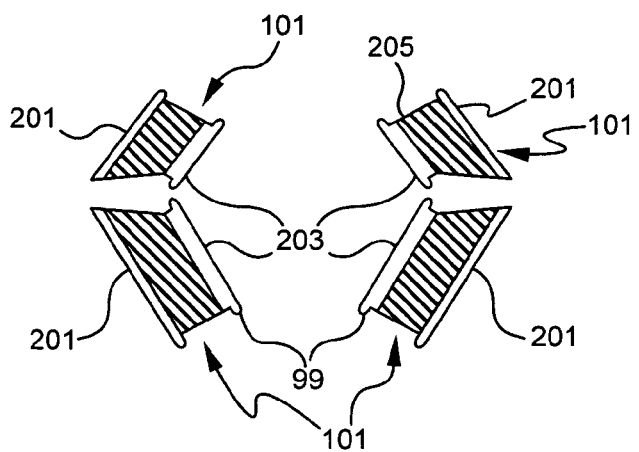
Figure 14F:
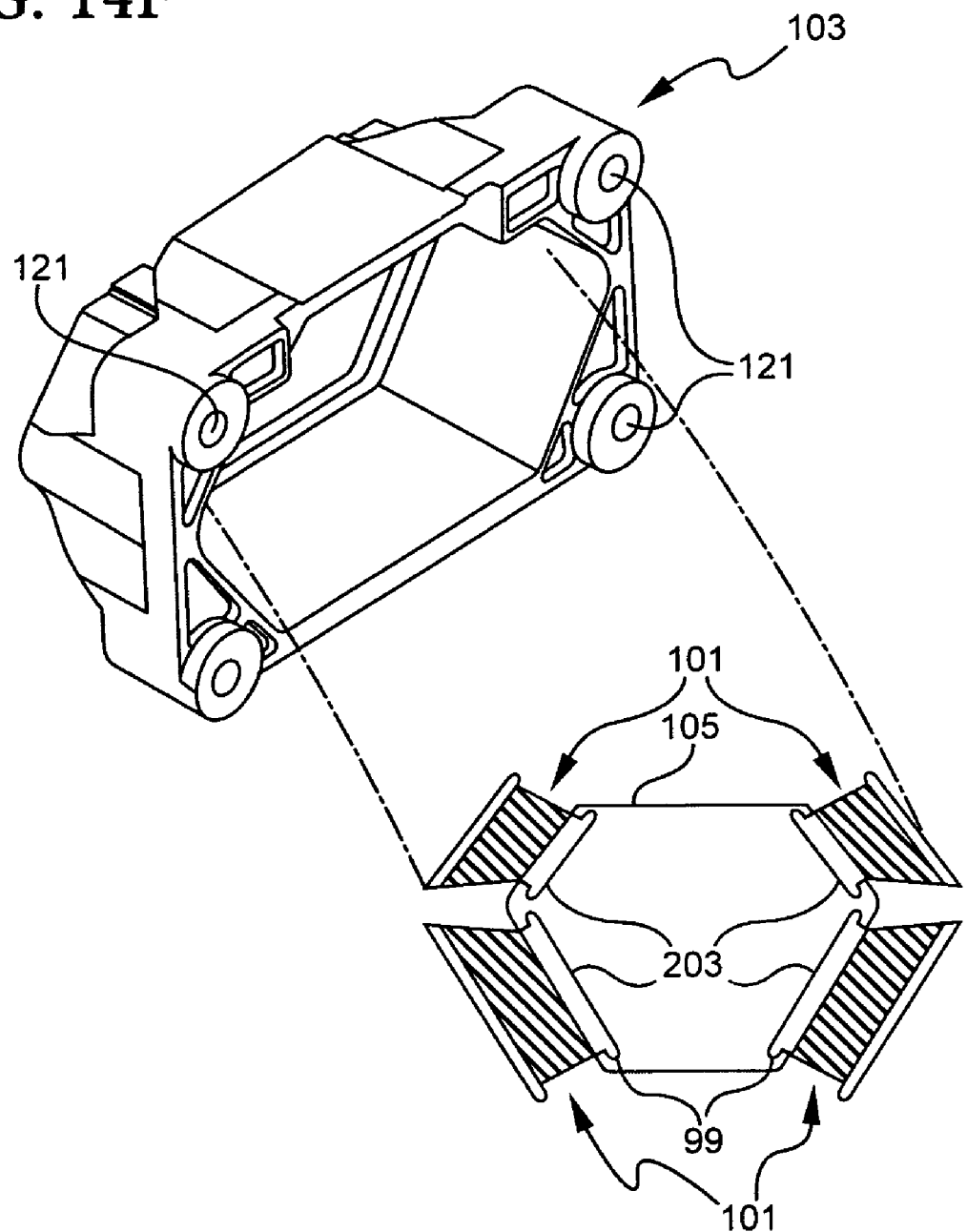

FIG. 3 illustrates the slidably mounting assembling of an elastomeric element 101A onto a respective inner plate 115A. Preferably the substantially planar inner plate 115 includes a pair of opposing corresponding elongated sliding channel rail mating members 99 for accepting the pair of opposing corresponding elongated sliding channel rail mating members 99 of the substantially planar bottom plate 115. In a preferred embodiment the pair of opposing corresponding elongated sliding channel rail mating members 99 are comprised of a pair of extensions or rails 301A (only one rail 301A is shown in FIG. 3, but the pair of rails 301B of the other inner plate 115B are shown) are provided at two sides of the inner plate 115A such that the mating channels 211A on the bottom plate 203A of the elastomeric element 101a can slide along the rails downwards until the elastomeric element 101A is fully assembled onto the respective inner plate 115A. Some space 303 is left around the joint between the rails 301A, 301B for allowing easy assemble of the elastomeric element. Furthermore, the opposing corresponding elongated sliding channel rail mating member channels 211A and respective rails 301A are configured such that the channels are capably of relatively tightly gripping the rails. Though such grip assists retaining each individual elastomeric element on respective inner plate, the elastomeric elements are fully retained in position after the outer member is bolted thereto with bolts 10. FIGS. 9A-B show an isolation mount embodiment of the invention utilizing four individual elastomeric elements 101 (101A, 101B, 101C, 101D). As shown in FIGS. 9A-B two pairs of individual elastomeric elements 101, such as used in FIGS. 1-6, 8, are used in the assembly of an engine isolation mount having an X-configuration, that provides and assists in obtaining an appropriate ratio of stiffness of the engine mount in order to reduce vibration.

A further embodiment of the invention is shown in FIG. 10. As shown in FIG. 10 the inner member 105 includes substantially planar inner plates 115 with a pairs of opposing corresponding elongated sliding channel rail mating members 99 for accepting the pair of opposing corresponding elongated sliding channel rail mating members 99 of the substantially planar bottom plate 115. As shown in FIG. 10E, the individual elastomeric elements 101 preferably are comprised of the nonelastomeric rigid planar plates 203 with the opposing corresponding elongated sliding channel rail mating members 99 comprised of protruding elongated rails 301 that mate with the elongated channels 211 in the inner member 105 at the inner plated 115. In embodiments the substantially planar nonelastomeric rigid plates 201 and 203 are formed from a rigid metal or other rigid material such as Nylon 66, in preferred embodiments the substantially planar nonelastomeric rigid plates 201 and 203 are formed from a metal, such as from a stamped steel or aluminum plate or an extruded aluminum plate. 13. As shown in FIG. 10, a preferred embodiment of the vehicle drive train isolation mount includes at least one elastomeric snubber member 400. As shown in FIG. 10, the isolation mount inner member includes a pair of snubber opposing corresponding elongated sliding channel rail mating members 99 at two opposite sides, and an elastomeric snubber member 400 wherein the elastomeric snubber member 400 has a pair of opposing corresponding elongated sliding channel rail mating members 99 at two opposite sides of its rigid plate for slidably mounting with the respective inner member snubber opposing corresponding elongated sliding channel rail mating members 99 of the inner member 105. Preferably the snubber member 400 includes a substantially planar nonelastomeric rigid plate having a planar orientation, with the snubber member plate planar orientation substantially normal to the planes of the inner member first and second inner plates 115. As shown in FIG. 10B, preferably the elastomeric snubber member 400 is slidably mounted with the inner member snubber opposing corresponding elongated sliding channel rail mating members 99 and inhibits a removal movement of the first and second individual elastomeric elements 201 from said inner member 105, preferably as shown the snubber member 400 is a keystone snubber plate locking in the elastomeric elements rigid metal plates of the first and second individual elastomeric elements 201 and the top snubber member 400 that are already slidably mounted to the inner member 105.

The invention includes a vehicle engine power train drive system isolation mount for supporting and isolating one part from another. Preferably the isolation mount provides a vehicle engine power train drive system part mounted to and isolated from a vehicle chassis part. Preferably the vehicle power train isolation mount includes an inner member 105 formed to be connected to one of the parts, preferably either the vehicle engine power train drive system part or the vehicle chassis part. The inner member 105 includes a first and a second inner plate 115 being connected at one end and extending at a first angle $\theta_{1st}$ with respect to each other, the inner member preferably having a third and a fourth inner plate 115 being connected at one end and extending at a second angle $\theta_{2nd}$ with respect to each other. Preferably the vehicle power train isolation mount includes an outer member 103 formed to be connected to the other one of the parts (vehicle engine power train drive system part or vehicle chassis part that the inner member is not connected to). The outer member 103 has a first and a second outer plate 107 being connected at one end and extending at a third angle with respect to each other, preferably with the outer member 103 having a third and a fourth outer plate 107 being connected at one end and extending at a fourth angle with respect to each other. The isolation mount includes a first individual elastomeric element 101 compressed between the first inner plate 115 and the first outer plate 107, a second individual elastomeric element 101 compressed between the second inner plate 115 and the second outer plate 107, a third individual elastomeric element 101 compressed between the third inner plate 115 and the third outer plate 107, a fourth individual elastomeric element 101 compressed between the fourth inner plate 115 and the fourth outer plate 107. Preferably each individual elastomeric element 101 is slidably mounted to its respective inner plate 115. Preferably each inner plate 115 has a pair of opposing corresponding elongated sliding channel rail mating members 99 at its two opposite sides, and wherein each elastomeric element 101 has a pair of opposing corresponding elongated sliding channel rail mating members 99 at its two opposite sides for slidably mounting with the respective inner plate opposing corresponding elongated sliding channel rail mating members 99 for slidably mounting each individual elastomeric element 101 to its respective inner plate 115. Preferably the inner plate pair of opposing corresponding elongated sliding channel rail mating members 99 are substantially parallel to each other. Preferably the elastomeric element pair of opposing corresponding elongated sliding channel rail mating members 99 are substantially parallel to each other. In a preferred alternative embodiment the individual elastomeric element 101 is slidably mounted to its respective outer plate 107, with the outer plate 107 having a pair of opposing corresponding elongated sliding channel rail mating members 99 at its two opposite sides, and wherein the elastomeric element 101 has a pair of opposing corresponding elongated sliding channel rail mating members 99 at its two opposite sides for slidably mounting with the respective outer plate opposing corresponding elongated sliding channel rail mating members 99 for slidably mounting the individual elastomeric element 101 to its respective outer plate. Preferably the inner plate 115 is substantially planar and has a pair of opposing corresponding elongated sliding channel rail mating members 99 at its two opposite sides, and wherein each elastomeric element 101 has a bonded first metal rigid substantially planar plate 203 with a pair of opposing corresponding elongated sliding channel rail mating members 99 at its two opposite sides for slidably mounting with the respective inner plate opposing corresponding elongated sliding channel rail mating members 99 for slidably mounting each individual elastomeric element 101 to its respective inner plate 115. Preferably the elastomeric element pair of opposing corresponding elongated sliding channel rail mating members 99 are substantially parallel to each other, and each of the elastomeric elements 101 has a bonded second metal rigid substantially planar plate 201, the bonded second metal rigid substantially planar plate 201 substantially parallel to the bonded first metal rigid substantially planar plate 203. Preferably the outer plate 107 is substantially planar for abutment with the bonded second metal rigid substantially planar plate 201, wherein movement between the outer plate 107 and the bonded second metal rigid planar plate 201 is inhibited, preferably including an attachment means such as projection 207 with bolt screw hole 209. Preferably each elastomeric element 201 includes an elastomeric component 205 and a first metal plate bonded 203 to the elastomeric component 205 and being contiguous with its respective inner plate 115 when the elastomeric element 201 is assembled to its respective inner plate 115, and wherein each of two opposite sides of each metal plate includes the opposing corresponding elongated sliding channel rail mating members 99 at its two opposite sides for slidably mounting with the respective inner plate opposing corresponding elongated sliding channel rail mating members 99. Preferably each elastomeric element 201 includes an elastomeric component 205 and a second metal plate 201 bonded to the elastomeric component 205 and being contiguous with its respective outer plate 107 when the elastomeric element 201 is assembled to its respective outer plate 107. In an alternative embodiment each of two opposite sides of each metal plate includes the opposing corresponding elongated sliding channel rail mating members 99 at its two opposite sides for slidably mounting with the respective outer plate opposing corresponding elongated sliding channel rail mating members 99. Preferably each individual elastomeric element 201 includes a molded elastomer rubber block elastomeric component 205 bonded to a nonelastomeric element rigid metal plate, preferably with a first rigid metal plate 203 and an opposing second rigid metal plate 201 such that movements of the individual elastomeric elements 101 relative to the respective inner member inner plate 115 or the outer member outer plate 107 are prevented.

The invention includes a vehicle engine power train drive system isolation mount elastomeric sandwich member for sandwiching between an inner and an outer member of an isolation mount which is to support and isolate one part from another part. Preferably the isolation mount supports and isolates a vehicle engine power train drive system part from a vehicle chassis part. Preferably the inner member 105 is formed to be connected to one of the parts and has at least a first and a second inner plate 115 which are preferably connected at one end and extend at a first angle $\theta_{1st}$ with respect to each other. Preferably the outer member 103 is formed to be connected to one of the parts and has at least a first and a second outer plate 107 which are preferably connected at one end and extend at a second angle $\theta_{2nd}$ with respect to each other. The elastomeric sandwich member is comprised of an individual elastomeric element 101 for compression between the first inner plate 115 and the first outer plate 107, with the individual elastomeric element 101 slidably mountable to the first inner plate 115. In an alternative embodiment the elastomeric sandwich member individual elastomeric element 101 is slidably mountable to the first outer plate 107. Preferably the first inner plate 115 has a pair of opposing corresponding elongated sliding channel rail mating members 99 at its two opposite sides, and elastomeric sandwich member individual elastomeric element 101 has a pair of opposing corresponding elongated sliding channel rail mating members 99 at its two opposite sides for slidably mounting with the respective inner plate 115 opposing corresponding elongated sliding channel rail mating members 99 for slidably mounting each individual elastomeric element 101 to its respective inner plate. Preferably the individual elastomeric element pair of opposing corresponding elongated sliding channel rail mating members 99 are substantially parallel to each other. Preferably the individual elastomeric element 101 includes an elastomeric component 205 and a first rigid metal plate 203 bonded to the elastomeric component 205 and is contiguous with the inner plate 115 when the elastomeric element 101 is assembled to the inner plate 115, with each of two opposite sides of the individual elastomeric element first rigid metal plate 203 having the opposing corresponding elongated sliding channel rail mating members 99 at its two opposite sides for slidably mounting with the inner plate 115 opposing corresponding elongated sliding channel rail mating members 99. Preferably each individual elastomeric element 101 includes a molded elastomer rubber block elastomeric component 205 bonded to an elastomeric element rigid metal plate, preferably a first rigid metal plate 203 and an opposing second rigid metal plate 201 with the elastomeric element rigid metal plate including the elongated sliding channel rail mating members 99 and a planar base for contiguous abutment with the inner plate 115 when assembled to the inner plate 115, such that movements of the individual elastomeric elements 101 relative to the respective inner member inner plate 115 or the outer member outer plate 107 are prevented. Preferably the elastomeric element 101 includes a molded elastomer rubber block elastomeric component 205 bonded to a first inner elastomeric element substantially planar rigid metal plate 203 and an opposing second inner elastomeric element substantially planar rigid metal plate 201, with the plane of the first inner elastomeric element substantially planar rigid metal plate 203 substantially parallel with the plane of the opposing second inner elastomeric element substantially planar rigid metal plate 201. Preferably each individual elastomeric element 101 includes a molded elastomer rubber block elastomeric component bonded 205 to a first inner elastomeric element rigid metal plate 203 and an opposing second inner elastomeric element rigid metal plate 201 with the elastomeric element rigid metal plate including the elongated sliding channel rail mating members 99 and a planar base for contiguous abutment with the inner plate 115 when assembled to the inner plate such that movements of the individual elastomeric elements 101 relative to the respective inner member inner plate 115 or the outer member outer plate 107 are prevented. Preferably the elastomeric element 101 includes a molded elastomeric block 205 having a second metal plate 201 mold bonded to an opposing surface, and wherein the second plate 201 is attached to the outer plate 107 such that movements of the elastomeric element 101 relative to the respective inner and outer plate are prevented.

The invention includes a method of making a vehicle engine power train drive system isolation mount for supporting and isolating one part from another. Preferably the method provides a means for a vehicle engine power train drive system part mounted to and isolated from a vehicle chassis part. Preferably the method includes providing an inner member 105 which is formed to be connected to one of the parts and has at least a first and a second inner plate 115 preferably being connected at one end and extending at a first angle $\theta_{1st}$ with respect to each other. Preferably the method includes providing an outer member 103 which is formed to be connected to one of the parts and has at least a first and a second outer plate 107 preferably being connected at one end and extending at a second angle $\theta_{2nd}$ with respect to each other. Preferably the method includes providing a plurality of individual elastomeric member elements 101, the plurality of individual elastomeric member elements 101 formed from a plurality of elastomers 205 mold bonded between a plurality of individual elastomeric member element rigid metal plates 203 and 201. Preferably the method includes selecting a first individual elastomeric member element 101, selecting a second individual elastomeric member element 101, and disposing the selected first individual elastomeric member element 101 in compression between the inner member first inner plate 115 and the outer member first outer plate 107, and disposing the selected second individual elastomeric member element 101 in compression between the inner member second inner plate 115 and the outer member second outer plate 107 to provide the vehicle engine power train drive system isolation mount for supporting and isolating the one part from the another part. Preferably the method provides the isolation mount for a vehicle engine power train drive system part mounted to and isolated from a vehicle chassis part. Preferably the method includes slidably mounting the first individual elastomeric element 101 to the inner member first inner plate 115, and slidably mounting the second individual elastomeric element 101 to the inner member second inner plate 115. Preferably providing the plurality of individual elastomeric member elements 101 with rigid metal plates 203, 201, includes providing individual elastomeric member elements 101 with rigid plates including pairs of opposing corresponding elongated sliding channel rail mating members 99 at its two opposite sides for slidably mounting with the respective inner plate 115 opposing corresponding elongated sliding channel rail mating members 99, for slidably mounting each individual elastomeric element to its respective inner plate. Preferably providing the plurality of individual elastomeric member elements 101 formed from the plurality of elastomers 205 mold bonded between the plurality of individual elastomeric member element rigid metal plates, includes providing at least a first elastomer 572 and a second different elastomer 572. Preferably the different elastomers are different in terms of elastomer composition, with the first and second elastomer differentiated by their respective composition. In a preferred embodiment the different elastomer composition are selected from elastomers comprised of different elastomer components. In a preferred embodiment the elastomers are chosen from the elastomer components group comprised of natural rubber (natural polyisoprene), synthetic polyisoprene (synthetic natural rubber), styrene butadiene, polybutadiene, butyl, chlorobutyl, ethylene, propylene, ethylene propylene diene monomer, chloroprene, chloro-sulfonated polyethylene, nitrile butadiene, epichlorohydrin, polyacrylate, polysulfide, polysiloxane, fluoro vinyl methyl siloxane, fluorinated hydrocarbon, urethane, and polynor-bornene. Preferably the different elastomers are different in terms of elastomer hardness properties. In a preferred embodiment providing the plurality of individual elastomeric member elements formed from the plurality of elastomers mold bonded between the plurality of individual elastomeric member element rigid metal plates, includes providing at least a first elastomer with a first elastomer Shore A Hardness A1 and at least a second elastomer with a second elastomer Shore A Hardness A2, wherein the first elastomer Shore A Hardness A1 is greater than the second elastomer Shore A Hardness A2. Preferably the different elastomers are chosen from the elastomer group comprised of elastomers having different Shore A Hardness in the range from 30-100. Preferably the different elastomers are selected from the elastomer group comprised of different Shore A Hardness elastomers chosen from the Shore A Hardness sub ranges of: 30-39 Shore A Hardness, 40-49 Shore A Hardness, 50-53 Shore A Hardness, 54-57 Shore A Hardness, 58-61 Shore A Hardness, 62-65 Shore A Hardness, 66-69 Shore A Hardness, 70-73 Shore A Hardness, 74-77 Shore A Hardness, 78-81 Shore A Hardness, 82-85 Shore A Hardness, 86-89 Shore A Hardness, 90-93 Shore A Hardness, 94-97 Shore A Hardness, and 97-100 Shore A Hardness. In an embodiment providing the plurality of individual elastomeric member elements 101 with rigid metal plates 201, 203, includes providing includes providing at least a first individual elastomeric member element 101 with a first elastomer 205 thickness T1 between a first individual elastomeric member element rigid metal plate 203 and a second individual elastomeric member element rigid metal plate 201, and providing at least a second individual elastomeric member element 101 with a second elastomer 205 thickness T2 between a third individual elastomeric member element rigid metal plate 203 and a fourth individual elastomeric member element rigid metal plate 201 with T1<T2, preferably selected from a variety of elastomer 205 thicknesses to provide different levels of elastomer 205 precompression when assembled between the inner plate 115 and the outer plate 107.

The invention includes a method of making a vehicle engine power train drive system isolation mount for supporting and isolating a vehicle engine power train drive system part from a vehicle chassis part. The method includes providing an inner member 105 having at least a first and a second inner plate 115, preferably being connected at one end and extending at a first angle $\theta_{1st}$ with respect to each other. The method includes providing an outer member 103 having at least a first and a second outer plate 107, preferably being connected at one end and extending at a second angle $\theta_{2nd}$ with respect to each other. The method includes providing a plurality of slidably mountable individual elastomeric member elements 101, the plurality of slidably mountable individual elastomeric member elements 101 divided into at least a first slidably mountable individual elastomeric member element group with the first slidably mountable individual elastomeric member element group elastomeric member elements are substantially identical. Preferably the elastomeric member element group is substantially identical in terms of a common substantially identical elastomer composition, elastomer Shore A Hardness, and elastomer thickness, most preferably with the elastomeric member element group produced in the same molding batch. The method includes providing a plurality of slidably mountable individual elastomeric member elements 101, the plurality of slidably mountable individual elastomeric member elements 101 divided into at least a second slidably mountable individual elastomeric member element group with the second slidably mountable individual elastomeric member element group elastomeric member elements are substantially identical (common elastomer composition, elastomer Shore A Hardness, and elastomer thickness), with the second slidably mountable individual elastomeric member element group commonality different from the first slidably mountable individual elastomeric member element group. The method includes selecting at least two desired slidably mountable individual elastomeric member elements 101 from either the first group or the second group, and slidably mounting a first one of the selected at least two desired slidably mountable individual elastomeric member elements 101 between the first inner plate 115 and the first outer plate 107, and slidably mounting a second one of the selected at least two desired slidably mountable individual elastomeric member elements 101 between the second inner plate 115 and the second outer plate 107 to provide the vehicle engine power train drive system isolation mount. Preferably the inner member 115 includes a third and a fourth inner plate 115, preferably being connected at an end and extending at an angle with respect to each other, and the outer member includes a third and a fourth outer plate 107, preferably being connected at an end and extending at an angle with respect to each other. Preferably the method includes selecting a third and a fourth desired slidably mountable individual elastomeric member element 101 from a group different than the selected first and second desired slidably mountable individual elastomeric member elements, and slidably mounting the selected third desired slidably mountable individual elastomeric member element 101 between the third inner plate 115 and the third outer plate 107, and slidably mounting the selected fourth desired slidably mountable individual elastomeric member element 101 between the fourth inner plate 115 and the fourth outer plate 107.

The invention includes a method of making n different types of vehicle engine power train drive system isolation mounts with n being equal to or greater than 2. Preferably method includes making the n different types of vehicle engine power train drive system isolation mounts with a single manufacturing facility. The method includes providing a plurality of slidably mountable individual elastomeric member elements 101, the plurality of individual elastomeric member elements 101 formed from a plurality of elastomers 205 mold bonded to a plurality of individual elastomeric member element rigid metal plates 203, with the rigid plates 203 including a pair of opposing corresponding elongated sliding channel rail mating members 99 at its two opposite sides for slidably mounting with the respective inner plate 115 opposing corresponding elongated sliding channel rail mating members 99, for slidably mounting each individual elastomeric member element 101 to its respective inner plate 115. The method includes providing a first inner member 105 having at least a first and a second inner plate 115, preferably being connected at one end and extending at a first angle $\theta_{1st}$ with respect to each other, and providing a first outer member 103 having at least a first and a second outer plate 107 preferably being connected at one end and extending at a first angle $\theta_{1st}$ with respect to each other. The method includes slidably mounting a first individual elastomeric member element 101 and a second individual elastomeric member element 101 to the first inner member 105 to provide a first type of the isolation mounts. The method includes providing a second inner member 105 having at least a first and a second inner plate 115, preferably being connected at one end and extending at a first angle $\theta_{1st}$ with respect to each other, and providing a second outer member 103 having at least a first and a second outer plate 107. The method includes slidably mounting a third individual elastomeric member element 101 and a fourth individual elastomeric member element 101 to the second inner member 105 to provide a second type of the isolation mount, the second type of the isolation mount different from the first type of isolation mount. Preferably providing a plurality of slidably mountable individual elastomeric member elements 101, includes providing a plurality of slidably mountable individual elastomeric member elements 101 divided into at least a first slidably mountable individual elastomeric member element group with the first slidably mountable individual elastomeric member element group elastomeric member elements are substantially identical (first common elastomer composition, elastomer Shore A Hardness, and elastomer thickness), and divided into at least a second slidably mountable individual elastomeric member element group with the second slidably mountable individual elastomeric member element group elastomeric member elements are substantially identical (second common elastomer composition, elastomer Shore A Hardness, and elastomer thickness), with the second slidably mountable individual elastomeric member element group different from the first slidably mountable individual elastomeric member element group.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An isolation mount for supporting and isolating one part from another, comprising:
　an inner member formed to be connected to one of the parts, the inner member having an inner member first inner plate and an inner member second inner plate being connected at one end and extending at a first angle with respect to each other; and
　an outer member formed to be connected to one of the parts, the outer member having an outer member first outer plate and an outer member second outer plate being connected at one end and extending at a second angle with respect to each other;
　a first individual elastomeric member element with an elastomer bonded to and between a first individual elastomeric member element first inner rigid plate and a first individual elastomeric member element second outer rigid plate, the first individual elastomeric member element disposed in compression between the inner member first inner plate and the outer member first outer plate with the first individual elastomeric member element first inner rigid plate adjacent the inner member first inner plate and the first individual elastomeric member element second outer rigid plate adjacent the outer member first outer plate, and a second individual elastomeric member element with an elastomer bonded to and between a second individual elastomeric member element first inner rigid plate and a second individual elastomeric member element second outer rigid plate, the second individual elastomeric member element disposed in compression between the inner member second inner plate and the outer member second outer plate with the second individual elastomeric member element first inner rigid plate adjacent the inner member second inner plate and the second individual elastomeric member element second outer rigid plate adjacent the outer member second outer plate.

2. The isolation mount of claim 1, wherein the first individual elastomeric member element first inner rigid plate is slidably mounted to the inner member first inner plate and the second individual elastomeric member element first inner rigid plate is slidably mounted to the inner member second inner plate.

3. The isolation mount of claim 2, wherein the inner member first inner plate has a pair of rails at its two opposite sides and the first individual elastomeric member element first inner rigid plate has a pair of mating channels at its respective two opposite sides for slidably mounting the first individual elastomeric member element first inner rigid plate to the inner member first inner plate, and the inner member second inner plate has a pair of rails at its two opposite sides and the second individual elastomeric member element first inner rigid plate has a pair of mating channels at its respective two opposite sides for slidably mounting the second individual elastomeric member element first inner rigid plate to the inner member second inner plate.

4. The isolation mount of claim 3, wherein the first individual elastomeric member element first inner rigid plate pair of mating channels are substantially parallel to each other, and the second individual elastomeric member element first inner rigid plate pair of mating channels are substantially parallel to each other.

5. The isolation mount of claim 1, wherein said inner member includes a pair of snubber opposing corresponding elongated sliding channel rail mating members, and an elastomeric snubber member wherein said elastomeric snubber member has a pair of opposing corresponding elongated sliding channel rail mating members for slidably mounting with the respective inner member snubber opposing corresponding elongated sliding channel rail mating members.

6. The isolation mount of claim 5, wherein elastomeric snubber member slidably mounted with said inner member snubber opposing corresponding elongated sliding channel rail mating members inhibits a removal of said first and second individual elastomeric elements from said inner member.

7. The isolation mount of claim 1, wherein each elastomeric element is of an at least substantially cuboid shape.

8. The isolation mount of claim 1, wherein each second rigid plate is bolted to the respective outer plate such that movements of the elastomeric elements relative to the respective inner or outer plate are prevented.

9. The isolation mount of claim 1, wherein each inner plate extends at least substantially straight such that the isolation mount exhibits a V shape.

10. The isolation mount of claim 1, wherein the outer member is a casting of aluminum.

11. The isolation mount of claim 1, wherein the outer member is a ductile iron casting and the inner member is an aluminum casting.

12. The isolation mount of claim 1, wherein the outer member is an aluminum casting and the inner member is a ductile iron casting.

13. The isolation mount of claim 1, wherein the first individual elastomeric member element and the second individual elastomeric member element are of at least substantially symmetrical or identical configuration.

14. An elastomeric sandwich member for sandwiching between an inner and an outer member of an isolation mount, which is to support and isolate one part from another for supporting and isolating one part from another, wherein the inner member is formed to be connected to one of the parts and has at least a first inner plate, wherein the outer member is formed to be connected to one of the parts and has at least a first outer plate, said elastomeric sandwich member comprised of a first individual elastomeric member element with an elastomer mold bonded between a first inner rigid plate and a second outer rigid plate in a mold, the first inner rigid plate slidably mounted to said first inner member first inner plate, the first individual elastomeric member element disposed in compression between the inner member first inner plate and the outer member first outer plate with the first individual elastomeric member element first inner rigid plate adjacent the inner member first inner plate and the first individual elastomeric member element second outer rigid plate adjacent the outer member first outer plate.

15. The elastomeric sandwich member of claim 14, wherein said first inner plate has a pair of opposing corresponding elongated sliding channel rail mating members, and wherein said individual elastomeric element first inner rigid plate has a pair of opposing corresponding elongated sliding channel rail mating members for slidably mounting with the respective inner plate opposing corresponding elongated sliding channel rail mating members.

16. The elastomeric sandwich member of claim 15, wherein said individual elastomeric element first inner rigid plate pair of opposing corresponding elongated sliding channel rail mating members are substantially parallel to each other.

17. The elastomeric sandwich member of claim 14, wherein said individual elastomeric element second outer rigid plate is slidably mountable to said first outer plate.

18. The elastomeric sandwich member of claim 14, the first individual elastomeric member element first inner rigid plate substantially planar with a plane and the second outer rigid plate substantially planar with a plane, with the first inner rigid plate plane substantially parallel with the second outer rigid plate plane.

19. The elastomeric sandwich member of claim 14 wherein said elastomeric element second outer rigid plate is attached to the outer member first outer plate such that movements of the elastomeric element relative to the respective inner and outer plate are prevented.

20. A method of making an isolation mount for supporting and isolating one part from another, said method comprising: providing an inner member which is formed to be connected to one of the parts and has at least a first and a second inner plate, providing an outer member which is formed to be connected to one of the parts and has at least a first and a second outer plate, providing a plurality of individual elastomeric member elements, said plurality of individual elastomeric member elements formed from a plurality of elastomers mold bonded between a plurality of individual elastomeric member element inner and outer rigid plates,
  selecting a first individual elastomeric member element with an elastomer mold bonded between an outer rigid plate and an inner rigid plate in a mold,
  selecting a second individual elastomeric member element with an elastomer mold bonded between an outer rigid plate and an inner rigid plate in a mold, disposing said first individual elastomeric member element in compression between said inner member first inner plate and the outer member first outer plate with said first individual elastomeric member element elastomer mold bonded inner rigid plate adjacent said inner member first inner plate and with said first individual elastomeric member element elastomer mold bonded outer rigid plate adjacent said outer member first outer plate and, disposing said second individual elastomeric member element in compression between said inner member second inner plate and the outer member second outer plate with said second individual elastomeric member element elastomer mold bonded inner rigid plate adjacent said inner member second inner plate and with said second individual elastomeric member element elastomer mold bonded outer rigid plate adjacent said outer member second outer plate to provide said isolation mount for supporting and isolating said one part from said another part.

21. A method as claimed in claim 20, wherein providing said plurality of individual elastomeric member elements with rigid plates, includes providing individual elastomeric member elements with rigid plates including pairs of opposing corresponding elongated sliding channel rail mating members.

22. A method as claimed in claim 21, wherein providing said plurality of individual elastomeric member elements with rigid plates, includes providing at least a first individual elastomeric member element with a first elastomer thickness T1 between a first individual elastomeric member element rigid plate and a second individual elastomeric member element rigid plate, and providing at least a second individual elastomeric member element with a second elastomer thickness T2 between a third individual elastomeric member element rigid plate and a fourth individual elastomeric member element rigid plate.

23. A method as claimed in claim 20, wherein said method includes slidably mounting said first individual elastomeric element elastomer mold bonded inner rigid plate to said inner member first inner plate, and slidably mounting said second individual elastomeric element elastomer mold bonded inner rigid plate to said inner member second inner plate.

24. A method as claimed in claim 20, wherein providing said plurality of individual elastomeric member elements formed from said plurality of elastomers mold bonded between said plurality of individual elastomeric member element rigid plates, includes providing at least a first elastomer with a first elastomer
Shore A Hardness A1 and a at least a second elastomer with a second elastomer Shore A Hardness A2, wherein said first elastomer
Shore A Hardness A1 is greater than said second elastomer Shore A Hardness A2.

25. A method as claimed in claim 20, wherein providing said plurality of individual elastomeric member elements formed from said plurality of elastomers mold bonded between said plurality of individual elastomeric member element rigid plates, includes providing at least a first elastomer and a second elastomer with said first mold bonded elastomer different from said second mold bonded elastomer.

26. A method of making a vehicle engine power train drive system isolation mount for supporting and isolating a vehicle engine power train drive system part from a vehicle chassis part, said method comprising:
providing an inner member having at least a first and a second inner plate, providing an outer member having at least a first and a second outer plate, providing a plurality of slidably mountable individual elastomeric member elements, said plurality of slidably mountable individual elastomeric member elements formed from a plurality of elastomers mold bonded between a plurality of individual elastomeric member element inner and outer rigid plates in at least a first mold, said plurality of slidably mountable individual elastomeric member elements divided into at least a first slidably mountable individual elastomeric member element group with said first slidably mountable individual elastomeric member element group elastomeric member elements are substantially identical, and into at least a second slidably mountable individual elastomeric member element group with said second slidably mountable individual elastomeric member element group elastomeric member elements are substantially identical, with said second slidably mountable individual elastomeric member element group different from said first slidably mountable individual elastomeric member element group, selecting at least two desired slidably mountable individual elastomeric member elements from either said first group or said second group, slidably mounting a first one of said at least two desired slidably mountable individual elastomeric member elements between said first inner plate and said first outer plate, slidably mounting a second one of said at least two desired slidably mountable individual elastomeric member elements between said second inner plate and said second outer plate.

27. A method as claimed in claim 26, wherein said inner member includes a third and a fourth inner plate, and said outer member includes a third and a fourth outer plate,
selecting a third and a fourth desired slidably mountable individual elastomeric member element from a group different than said first and second desired slidably mountable individual elastomeric member elements,
slidably mounting said third desired slidably mountable individual elastomeric member element between said third inner plate and said third outer plate, and slidably mounting said fourth desired slidably mountable individual elastomeric member element between said fourth inner plate and said fourth outer plate.

28. A method of making n different types of isolation mounts, with n being equal to or greater than 2, said method comprising:
providing a plurality of slidably mountable individual elastomeric member elements,
said plurality of individual elastomeric member elements formed from a plurality of elastomers mold bonded to a plurality of individual elastomeric member element rigid plates in at least a first mold, said rigid plates including a pair of opposing corresponding elongated sliding channel rail mating members,
providing a first inner member having at least a first and a second inner plate, and
providing a first outer member having at least a first and a second outer plate, slidably mounting a first individual elastomeric member element and a second individual elastomeric member element to said first inner member to provide a first type of said isolation mounts,
providing a second inner member having at least a first and a second inner plate, and providing a second outer member having at least a first and a second outer plate, slidably mounting a third individual elastomeric member element and a fourth individual elastomeric member element to said second inner member to provide a second type of said isolation mounts, said second type of said isolation mount different from said first type.

29. A method as claimed in claim 28, wherein providing a plurality of slidably mountable individual elastomeric member elements, includes providing a plurality of slidably mountable individual elastomeric member elements divided into at least a first slidably mountable individual elastomeric member element group with said first slidably mountable individual elastomeric member element group elastomeric member elements are substantially identical, and divided into at least a second slidably mountable individual elastomeric member element group with said second slidably mountable individual elastomeric member element group elastomeric member elements are substantially identical, with said second slidably mountable individual elastomeric member element group different from said first slidably mountable individual elastomeric member element group.

30. A method of making an isolation mount for supporting and isolating one part from another, said method comprising: providing an inner member which is formed to be connected to one of the parts and has a first and a second inner plate being connected at one end and extending at a first angle with respect to each other, providing an outer member which is formed to be connected to one of the parts and has a first and a second outer plate being connected at one end and extending at a second angle with respect to each other, selecting a first individual elastomeric member element, said first individual elastomeric member element formed from an elastomer mold bonded between a first metal plate and a second metal plate in a mold, and compressing and sandwiching said first individual elastomeric member element between the inner member first inner plate and the outer member first outer plate with the first individual elastomeric member element first metal plate adjacent the inner member first inner plate and the first individual elastomeric member element second metal plate adjacent the outer member first outer plate.

31. A method as claimed in claim 30 including selecting a second individual elastomeric member element, said second individual elastomeric member element formed from a second elastomer mold bonded between a first metal plate and a second metal plate in a mold, and compressing and sandwiching said second individual elastomeric member element between the inner member second inner plate and the outer member second outer plate with the second individual elastomeric member element second metal plate adjacent the inner member second inner plate and the second individual elastomeric member element second metal plate adjacent the outer member second outer plate.

32. A method as claimed in claim 30 including slidably mounting said first individual elastomeric member element to said inner member.

\* \* \* \* \*